US007651213B2

(12) United States Patent
Konno et al.

(10) Patent No.: US 7,651,213 B2
(45) **Date of Patent: *Jan. 26, 2010**

(54) IMAGE FORMING APPARATUS AND IMAGE FORMING METHOD

(75) Inventors: Masaaki Konno, Kanagawa (JP); Toshiyuki Makuta, Fujinomiya (JP); Tetsuzo Kadomatsu, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 474 days.

This patent is subject to a terminal disclaimer.

(21) Appl. No.: 11/493,771

(22) Filed: Jul. 27, 2006

(65) Prior Publication Data

US 2007/0024684 A1 Feb. 1, 2007

(30) Foreign Application Priority Data

Jul. 29, 2005 (JP) ............................ 2005-221041

(51) Int. Cl.
*B41J 2/01* (2006.01)
*G01D 11/00* (2006.01)

(52) U.S. Cl. ....................... 347/102; 347/101; 347/100; 347/95

(58) Field of Classification Search ................. 347/102, 347/101, 100, 95, 96; 106/31.6, 31.13, 31.27; 523/160
See application file for complete search history.

(56) References Cited

U.S. PATENT DOCUMENTS

2007/0013759 A1* 1/2007 Kadomatsu et al. ......... 347/102

FOREIGN PATENT DOCUMENTS

JP 10-287035 A 10/1998
JP 2000-135781 A 5/2000
JP 2003-12971 A 1/2003

* cited by examiner

*Primary Examiner*—Manish S Shah
(74) *Attorney, Agent, or Firm*—Birch, Stewart, Kolasch & Birch, LLP

(57) ABSTRACT

The image forming apparatus attaches a plurality of liquids onto a recording medium so as to form a desired image, the image forming apparatus including: a first liquid attaching device that attaches onto the recording medium a first liquid which contains a high-boiling organic solvent, a polymerization initiator, and a diffusion preventing agent for preventing diffusion and smearing of a second liquid to be attached onto the recording medium after the first liquid is attached onto the recording medium; a second liquid attaching device that attaches the second liquid which contains a radiation-curable polymerizable compound, onto at least an area of the recording medium onto which the first liquid has been attached; a third liquid attaching device that attaches a third liquid which contains a polymerization initiator and a radiation-curable polymerizable compound, onto at least an area of the recording medium onto which the first liquid and the second liquid have been attached; and a first radiation irradiating device that irradiates at least an area of the recording medium onto which the third liquid has been attached, with a radiation.

11 Claims, 9 Drawing Sheets

IMAGE FORMING APPARATUS AND IMAGE FORMING METHOD

BACKGROUND OF THE INVENTION

1. Field of the Invention

The present invention relates to an image forming apparatus and an image forming method, and in particular relates to image forming art for an image forming apparatus that attaches a coloring material-containing ink and a treatment liquid onto a medium so as to form a desired image on the medium.

2. Description of the Related Art

In recent years, inkjet recording apparatuses have become widespread as image forming apparatuses for forming images such as pictures and documents on media. In an inkjet recording apparatus, nozzles provided in a print head are driven in accordance with data, so that ink droplets are ejected from the nozzles, whereby a desired image is formed on a medium.

Depending on the type of the medium and the type of the ink, if the deposited ink permeates through the medium, then smearing or spreading out of the dots formed may occur, causing a marked degradation in the quality of the image formed. Moreover, if an ink droplet is ejected so as to overlap (contact) with at least part of another ink droplet already on the medium, then a phenomenon in which the ink droplets become mixed together (unite with one another), namely, deposition interference, can occur. To prevent image degradation due to such smearing or spreading out of dots, deposition interference and so on, an inkjet system has been proposed according to which ink and a treatment liquid that can react with the ink are deposited onto a medium, and the ink and the treatment liquid are made to react with one another on the medium, whereby smearing and spreading out of dots, and ink deposition interference are prevented. Moreover, an inkjet system has been proposed according to which, with regard to fixing the ink, after having been deposited onto the medium, the ink is irradiated with a radiation such as an ultraviolet radiation, so as to promote curing and fixing of the ink.

With an inkjet recording method, recorded article, and inkjet recording apparatus described in Japanese Patent Application Publication No. 10-287035, the configuration is such that printing is carried out by attaching a reaction liquid containing a photopolymerization initiator and an ink composition containing an acrylate monomer and an oligomer onto a recording medium, whereby print smearing and print irregularities are suppressed, and color bleeding, which is uneven color mingling at border regions between different colors in the color inkjet recording method, is prevented.

With an inkjet recording method described in Japanese Patent Application Publication No. 2003-12971, the configuration is such that printing is carried out by attaching an ink composition containing 30% to 98% by mass of a polymerizable compound and a coloring material, and a reaction liquid containing a polymerizable compound and a polymerization initiator onto a recording medium, whereby print smearing and print irregularities are suppressed, and color bleeding, which is uneven color mingling at border regions between different colors in the color inkjet recording method, is prevented.

Moreover, with an inkjet recording apparatus, image forming method, and ink composition described in Japanese Patent Application Publication No. 2000-135781, the configuration is such that a first ink composition and a second ink composition are mixed together and cured, so as to form at least part of an image, whereby a highly detailed clear image can be recorded even on plain paper that has not been subjected to special treatment.

With the inventions described in Japanese Patent Application Publication No. 10-287035, Japanese Patent Application Publication No. 2003-12971, and Japanese Patent Application Publication No. 2000-135781, art in which a radiation-curable ink is separated into two liquids is disclosed. However, in the case where the degree of the mixing of the two liquids is insufficient, or the case where the balance between the two liquids is poor in places, curing of the mixture of the two liquids is inadequate due to such causes, and hence there is a possibility that uncured mixture (reaction liquid) or ink remains on the medium.

SUMMARY OF THE INVENTION

In view of the above circumstances, it is an object of the present invention to provide an image forming apparatus and an image forming method according to which uncured (unfixed) liquid or ink can be prevented from remaining on a medium, and a desired image can be formed.

In order to attain the aforementioned object, the present invention is directed to an image forming apparatus that attaches a plurality of liquids onto a recording medium so as to form a desired image, the image forming apparatus comprising: a first liquid attaching device that attaches onto the recording medium a first liquid which contains a high-boiling organic solvent, a polymerization initiator, and a diffusion preventing agent for preventing diffusion and smearing of a second liquid to be attached onto the recording medium after the first liquid is attached onto the recording medium; a second liquid attaching device that attaches the second liquid which contains a radiation-curable polymerizable compound, onto at least an area of the recording medium onto which the first liquid has been attached; a third liquid attaching device that attaches a third liquid which contains a polymerization initiator and a radiation-curable polymerizable compound, onto at least an area of the recording medium onto which the first liquid and the second liquid have been attached; and a first radiation irradiating device that irradiates at least an area of the recording medium onto which the third liquid has been attached, with a radiation.

According to this aspect of the present invention, the second liquid, which contains a radiation-curable polymerizable compound, is attached onto the first liquid, which contains a diffusion preventing agent, a polymerization initiator, and a high-boiling organic solvent, then the third liquid, which contains a polymerization initiator and a radiation-curable polymerizable compound, is attached onto the area onto which the first liquid and the second liquid have been attached, and then the area onto which the third liquid has been attached is irradiated with a radiation by the first radiation irradiating device. As a result, even in the case where mixing of the first liquid and the second liquid is inadequate, or the case where the balance between the amounts of the first liquid and the second liquid (the ratio of the amounts of these liquids) is poor in places, curing is brought about by the third liquid, and hence curing defects can be avoided, whereby a desired image can be obtained.

"Diffusion preventing agent" here refers to a material for preventing diffusion and smearing of the second liquid attached onto the first liquid.

"Radiation-curable polymerizable compound" includes substances of which polymerization is initiated upon being mixed with a polymerization initiator and then radicals being generated from the polymerization initiator through irradiation with a radiation, examples including radiation-curable polymers, radiation-curable oligomers (prepolymers), and mixtures thereof. The radiation referred to here may be an ultraviolet radiation, an electron beam, or other radiations.

The first liquid may be a treatment liquid containing a diffusion preventing agent for preventing diffusion and smearing of an ink coloring material-containing ink. Moreover, the second liquid may be an ink containing an ink coloring material, and the third liquid may be an ink which does not contain an ink coloring material, or an ink of the same color as or a similar color to the recording medium.

The first liquid attachment area in which the first liquid is attached, and the second liquid attachment area in which the second liquid is attached are determined on the basis of image data for an image to be formed on the recording medium. Moreover, the third liquid may be selectively attached onto the first liquid attachment area and/or the second liquid attachment area, or may be attached over the whole surface of the recording medium.

The "image" referred to here has a broad meaning including text, symbols, drawings, patterns, and so on.

The recording medium is a medium onto which the first, second, and third liquids are attached by the first liquid attaching device, the second liquid attaching device, and the third liquid attaching device. "Recording medium" includes continuous paper, cut paper, sealing paper, a resin sheet such as a PHP sheet, a film, a cloth, and any of various other media with no limitation on material or form.

Preferably, the second liquid contains a coloring material.

According to this aspect of the present invention, the second liquid contains a coloring material. As a result, a color image can be formed on the recording medium. Note that a plurality of second liquid attaching devices for a plurality of second liquids containing coloring materials of different colors may be provided.

An example of the coloring material (colorant) contained in the second liquid is a pigment type coloring material. The content of the coloring material in the second liquid is preferable made to be in a range of approximately 1 to 10% by mass. Note also that each of the first liquid and the third liquid may contain a colorless transparent coloring material, or a very small amount of a coloring material such as not to be visible. "Very small amount" here means that the content is not more than 1% by mass, preferably not more than 0.5% by mass.

Preferably, the image forming apparatus further comprises a second radiation irradiating device that irradiates at least an area of the recording medium onto which the first liquid and the second liquid have been attached, with a radiation.

For the second radiation irradiating device, the same configuration as the first radiation irradiating device may be used, or a different configuration may be used. The irradiation energy from the second radiation irradiating device (preliminary curing device) is preferably made to be lower than the irradiation energy from the first radiation irradiating device (main curing device).

Preferably, the first liquid attaching device includes a droplet depositing device that deposits a droplet onto the recording medium.

According to this aspect of the present invention, a droplet depositing device is used as the first liquid attaching device. As a result, the first liquid can be attached in the required amount onto the required area, and hence there is a contribution to reducing the amount of the first liquid consumed.

An example of the droplet depositing device is an inkjet head (ejection head) having ejecting elements each comprising a nozzle (ejection hole) from which the liquid is ejected, a liquid chamber (pressure chamber) storing the liquid ejected from the nozzle, and an ejecting force applying device (actuator) that applies an ejecting force to the liquid in the liquid chamber.

Examples of such an inkjet head include a line type head having a nozzle row (ejecting element row) of a length corresponding to the whole width of the recording medium (the width over which ink can be deposited onto the recording medium), and a serial type head according to which a short head having a nozzle row of a length less than the whole width of the recording medium performs a scan in the recording medium width direction.

A line type inkjet head may have a configuration in which short heads each having a short ejection hole row shorter than the whole width of the recording medium are joined together arranged in a staggered shape so as to produce a length covering the whole width of the recording medium.

Preferably, the second liquid attaching device includes a droplet depositing device that deposits a droplet onto the recording medium.

According to this aspect of the present invention, a droplet depositing device is used as the second liquid attaching device. As a result, the second liquid can be attached in the required amount onto the first liquid, and hence there is a contribution to reducing the amount of the second liquid consumed.

The second droplet depositing device may have the same configuration as the first droplet depositing device, or a different configuration. Moreover, the first droplet depositing device and the second droplet depositing device may be integrated together. For example, a single droplet depositing device may be configured such that both the ejecting elements of the first droplet depositing device and the ejecting elements of the second droplet depositing device is provided therein.

Preferably, the third liquid attaching device includes a coating device that applies the third liquid onto the recording medium.

By making the third liquid attaching device be a coating device, the third liquid can be attached onto the recording medium evenly. Moreover, a liquid having a high viscosity that would not be suitable in the case of using a droplet depositing device as the third liquid attaching device can be used as the third liquid. If it is possible to make the third liquid have a high viscosity, then a substance for improving the curing ability can be contained in the third liquid, and hence the curing ability can be improved.

If a contact coating member such as a roller is used for the third liquid attaching device, then an image leveling effect can be obtained, and hence an appearance of relief of the image formed on the recording medium can be reduced.

Preferably, each of the first liquid and the second liquid has a viscosity of not less than 10 mPa·s and not more than 50 mPa·s.

In the case of the mode in which a droplet depositing device is used as each of the first liquid attaching device and the second liquid attaching device, it is preferable to make the viscosity of each of the first liquid and the second liquid be in a range of 10 to 20 mPa·s at room temperature, so that ejection is possible without a temperature adjusting device or the like. In the case of a mode in which the second liquid contains a polyfunctional polymerizable compound, the content of the polyfunctional polymerizable compound may be set such that the viscosity of the second liquid is suitable for ejection.

Preferably, the first liquid has a lower viscosity than the third liquid.

In the case of a mode in which the third liquid contains a polyfunctional polymerizable compound, if the content of the polyfunctional polymerizable compound is increased, then the curing ability of the third liquid can be improved. Moreover, if the content of the polyfunctional polymerizable compound in the third liquid is increased, then the viscosity of the third liquid is increased. In the case where the viscosity of the third liquid is higher than a certain predetermined value, the mode in which a coating device is used as the third liquid attaching device is preferable.

The viscosity of the first liquid is preferably not less than 10 mPa·s and not more than 20 mPa·s, and the viscosity of the third liquid is preferably not less than 20 mPa·s and not more than 200 mPa·s.

In order to attain the aforementioned object, the present invention is also directed to an image forming method for attaching a plurality of liquids onto a recording medium so as to form a desired image, the image forming method comprising the steps of: attaching onto the recording medium a first liquid which contains a high-boiling organic solvent, a polymerization initiator, and a diffusion preventing agent for preventing diffusion and smearing of a second liquid to be attached onto the recording medium after the first liquid is attached onto the recording medium; attaching the second liquid which contains a radiation-curable polymerizable compound, onto at least an area of the recording medium onto which the first liquid has been attached; attaching a third liquid which contains a polymerization initiator and a radiation-curable polymerizable compound, onto at least an area of the recording medium onto which the first liquid and the second liquid have been attached; and irradiating at least an area of the recording medium onto which the third liquid has been attached, with a radiation.

Preferably, the second liquid contains a coloring material.

Preferably, the image forming method further comprises the step of, after the second liquid is attached onto at least the area of the recording medium onto which the first liquid has been attached, irradiating at least an area of the recording medium onto which the first liquid and the second liquid have been attached with a radiation, so as to cure or semi-cure the first liquid and the second liquid, wherein the third liquid is attached onto at least the area of the recording medium onto which the first liquid and the second liquid have been attached after at least the area of the recording medium onto which the first liquid and the second liquid have been attached is irradiated with the radiation.

According to this aspect of the present invention, after the second liquid has been attached onto the first liquid, preliminary curing of the mixture of the first liquid and the second liquid is carried out. As a result, the third liquid can be attached on evenly.

“Preliminary curing” here refers to curing to an extent that the image (dots) formed from the mixture of the first liquid and the second liquid does not move from a predetermined position (e.g., the landing position) on the recording medium. That is, the preliminarily cured state is a state before the stage of a completely cured state.

According to the present invention, a second liquid containing at least a radiation-curable polymerizable compound is attached onto a first liquid containing a diffusion preventing agent and a polymerization initiator, then a third liquid containing at least a polymerization initiator and a radiation-curable polymerizable compound is attached onto the area onto which the first liquid and the second liquid have been attached, and then at least the area onto which the third liquid has been attached is irradiated with a radiation by a radiation irradiating device. As a result, even in the case where mixing of the first liquid and the second liquid is inadequate, or the case where the balance between the amounts of the first liquid and the second liquid (the ratio of the amounts of these liquids) is poor in places, curing is brought about by the third liquid, and hence curing defects can be avoided, whereby a desired image can be obtained.

BRIEF DESCRIPTION OF THE DRAWINGS

The nature of this invention, as well as other objects and benefits thereof, are explained in the following with reference to the accompanying drawings, in which like reference characters designate the same or similar parts throughout the figures and wherein.

DESCRIPTION OF THE PREFERRED EMBODIMENTS

Overall Configuration of Inkjet Recording Apparatus

Figure 1:
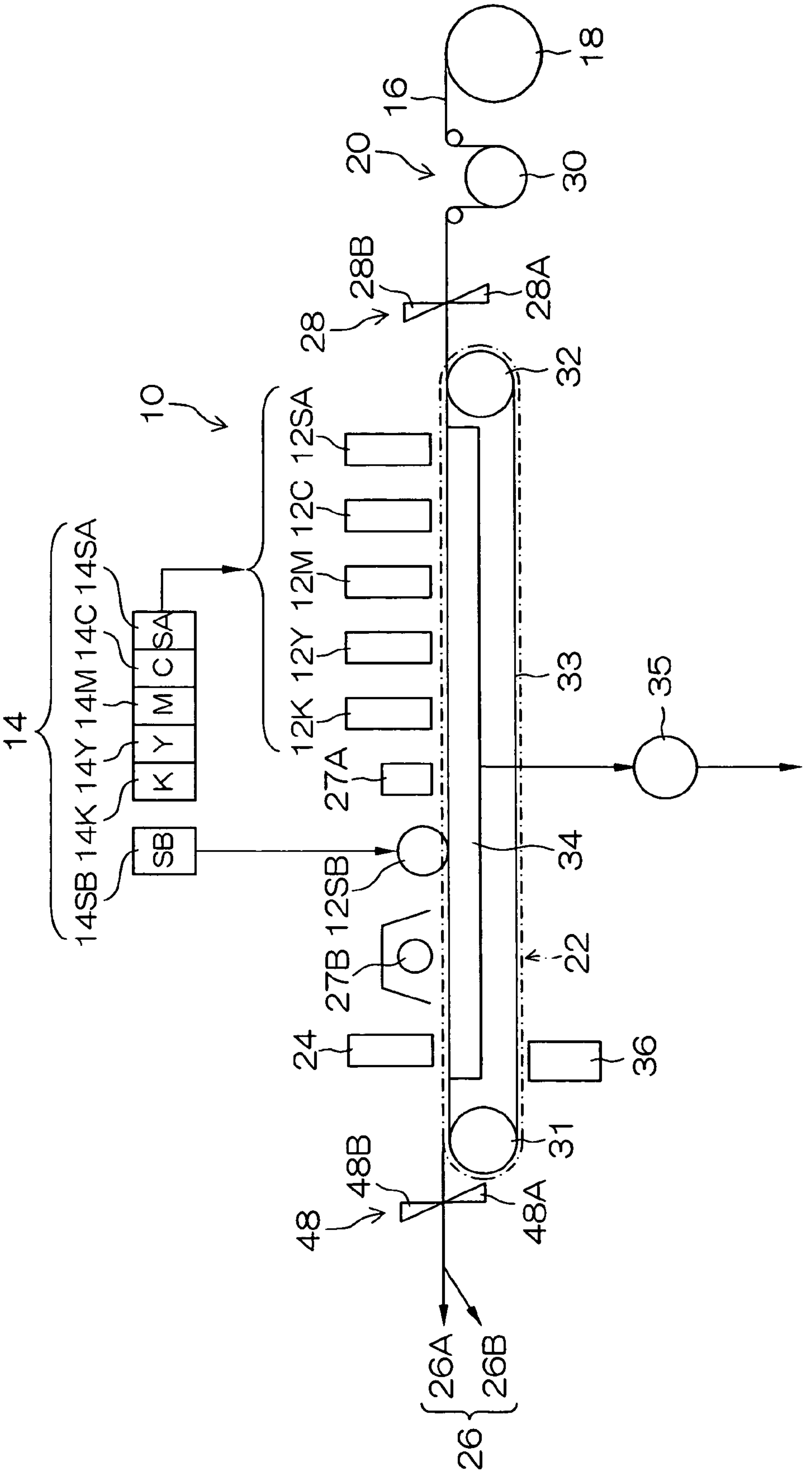
FIG. 1 is a general schematic drawing of an inkjet recording apparatus according to an embodiment of the present invention.

FIG. 1 is a general schematic drawing of an inkjet recording apparatus according to an embodiment of the present invention. The inkjet recording apparatus 10 shown in the present embodiment is a two-liquid type inkjet recording apparatus in which a treatment liquid (SA) and inks corresponding to various colors that have been deposited on a recording medium are irradiated with an ultraviolet radiation (UV) so as to bring about polymerization.

As shown in FIG. 1, the inkjet recording apparatus 10 comprises: a print unit 12 including a plurality of inkjet heads 12C, 12M, 12Y, and 12K that are provided respectively for cyan (C), magenta (M), yellow (Y), and black (K) inks (second liquids), a treatment liquid head 12SA for a treatment liquid (SA) (first liquid) which reacts with the colored inks, and a coating roller 12SB that applies a post-treatment liquid (SB) (third liquid) to an area of the recording medium onto which the treatment liquid (SA) and the colored inks have been deposited; an ink storing/loading unit 14 that stores the treatment liquids (SA, SB) to be supplied to the treatment liquid head 12SA and the coating roller 12SB and the inks (C, M, Y, K) to be supplied to the heads 12C, 12M, 12Y, and 12K; a paper supply unit 18 that supplies the recording medium (recording paper) 16; a decurling unit 20 that decurls the recording medium 16; a suction belt conveyance unit 22 that is disposed facing nozzle surfaces (ink ejection surfaces) of the print unit 12 and conveys the recording medium 16 while maintaining the flatness of the recording medium 16; a print determination unit 24 that reads the results of the printing by the print unit 12; and a paper discharge unit 26 that discharges the recording paper after recording (the printed article) to the outside.

Moreover, the inkjet recording apparatus 10 further comprises: a preliminary curing light source 27A (second radiation irradiating device) that is provided downstream of the inkjet heads 12C, 12M, 12Y, and 12K (i.e., downstream of the head 12K positioned furthest downstream in the paper conveyance direction; after the head 12K) and irradiates an area of the recording medium 16 onto which the treatment liquid and the colored inks have been deposited by UV so as to carry out preliminary curing of the colored inks; and a main curing light source 27B (first radiation irradiating device) that is provided downstream of the coating roller 12SB (i.e., after the coating roller 12SB) and irradiates an area of the recording medium 16 onto which the post-treatment liquid has been applied by the coating roller 12SB by UV so as to completely cure the colored inks and the post-treatment liquid (SB) (fix the colored inks and the post-treatment liquid to the recording medium 16).

Figure 2:
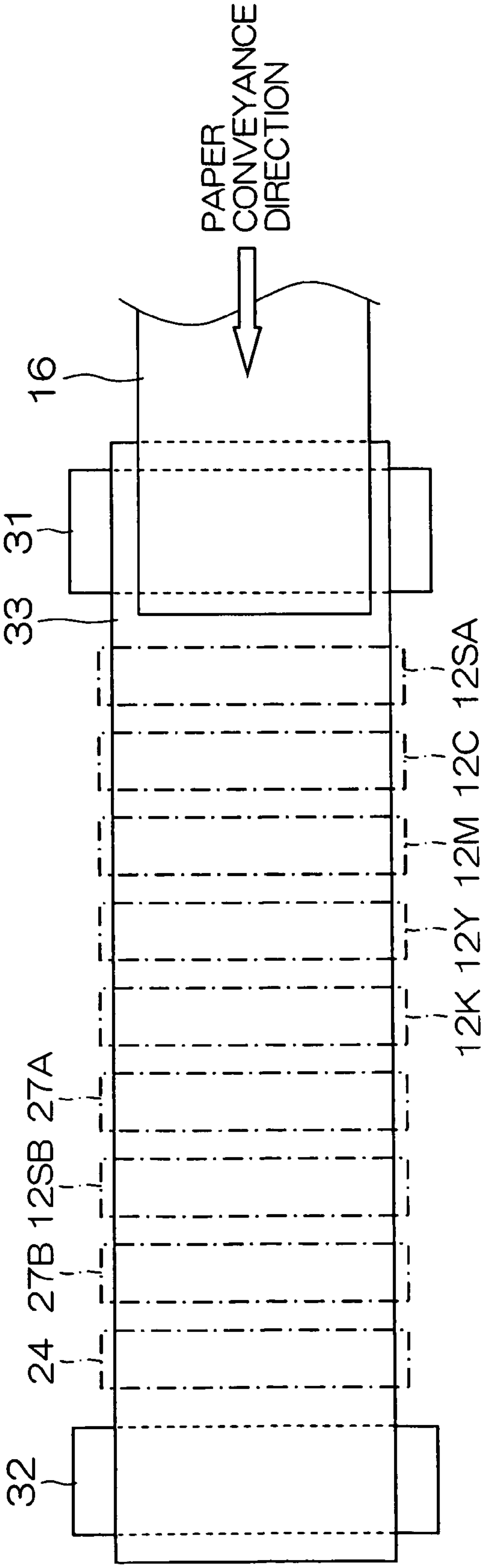
FIG. 2 is a plan view of principal components in a region around a print unit of the inkjet recording apparatus shown in FIG. 1.

In the present example, as shown in FIG. 2, each of the preliminary curing light source 27A and the main curing light source 27B has a length corresponding to the maximum width of the recording medium 16. Note that it is also possible to use a short preliminary curing light source 27A and a short main curing light source 27B each having a length shorter than the maximum width of the recording medium 16 and make the preliminary curing light source 27A and the main curing light source 27B perform scans in the width direction of the recording medium 16 so as to cover the maximum width of the recording medium 16, or to use a plurality of such short preliminary curing light sources 27A and a plurality of such short main curing light sources 27B in combination so as to cover the maximum width of the recording medium 16.

The ink storing/loading unit 14 includes: treatment liquid supply tanks 14SA and 14SB in which the treatment liquid (SA) ejected by the treatment liquid head 12SA and the post-treatment liquid (SB) applied by the coating roller 12SB are stored respectively; and ink supply tanks 14C, 14M, 14Y, and 14K in which the inks of the respective colors are stored. Each tank is communicated to a treatment liquid head or a colored ink head via a required pipeline. Moreover, the ink storing/loading unit 14 has a notification device (display device, warning alarm generating device) that notifies if the amount remaining of an ink becomes low, and also has a mechanism to prevent the inks of the various colors from being confused with one another when being loaded.

In FIG. 1, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording medium can be used, it is preferable that an information recording medium such as a bar code and a wireless tag containing information about the type of medium is attached to the magazine, and by reading the information contained in the information recording medium with a predetermined reading device, the type of recording medium to be used (type of medium) is automatically determined, and ink-droplet ejection is controlled so that the ink-droplets are ejected in an appropriate manner in accordance with the type of medium.

The recording medium 16 delivered from the paper supply unit 18 retains curl due to having been loaded in the magazine. In order to remove the curl, heat is applied to the recording medium 16 in the decurling unit 20 by a heating drum 30 in the direction opposite from the curl direction in the magazine. The heating temperature at this time is preferably controlled so that the recording medium 16 has a curl in which the surface on which the print is to be made is slightly round outward.

In the case of the configuration in which roll paper is used as the recording medium 16, a cutter (first cutter) 28 is provided as shown in FIG. 1, and the continuous paper is cut into a desired size by the cutter 28. The cutter 28 has a stationary blade 28A, whose length is not less than the width of the conveyor pathway of the recording medium 16, and a round blade 28B, which moves along the stationary blade 28A. The stationary blade 28A is disposed on the reverse side of the printed surface of the recording medium 16, and the round blade 28B is disposed on the printed surface side across the conveyor pathway. When cut papers are used, the cutter 28 is not required.

The decurled and cut recording medium 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor surface of the print determination unit 24 forms a horizontal plane (flat plane).

The belt 33 has a width that is greater than the width of the recording medium 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1. The suction chamber 34 provides suction with a fan 35 to generate a negative pressure, and the recording medium 16 is held on the belt 33 by suction.

The belt 33 is driven in the counter-clockwise direction in FIG. 1 by the motive force of a motor 88 (shown in FIG. 8) being transmitted to at least one of the rollers 31 and 32, which the belt 33 is set around, and the recording medium 16 held on the belt 33 is conveyed from right to left in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, or a combination of these. In the case of the configuration in which the belt 33 is nipped with the cleaning rollers, it is preferable to make the line velocity of the cleaning rollers different than that of the belt 33 to improve the cleaning effect.

The inkjet recording apparatus 10 can comprise a roller nip conveyance mechanism, in which the recording medium 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan (not shown) is disposed on the upstream side of the printing unit 12 (before the printing unit 12) in the recording medium conveyance pathway formed by the suction belt conveyance unit 22. The heating fan blows heated air onto the recording medium 16 to heat the recording medium 16 immediately before printing so that the ink deposited on the recording medium 16 dries more easily.

The print determination unit 24 provided in the post-stage of the main curing light source 27B (after the main curing light source 27B) has an image sensor which is a device for capturing an image of the ink-droplet deposition result by the printing unit 12, and functions as a device to check for ejection defects such as clogs of the nozzles in the printing unit 12 from the recorded image read by the image sensor.

The print determination unit 24 of the present embodiment is configured with at least a line sensor having rows of photoelectric transducing elements with a width that is greater than the ink-droplet ejection width (image recording width) of the heads 12C, 12M, 12Y, and 12K. This line sensor has a color separation line CCD sensor including an R (red) light receiving element row composed of photoelectric transducing elements (pixels) arranged in a line provided with an R filter, a green (G) light receiving element row with a G filter, and a blue (B) light receiving element row with a B filter. Instead of a line sensor, it is possible to use an area sensor composed of photoelectric transducing elements which are arranged two-dimensionally.

The print determination unit 24 reads a test pattern image (or an actual image) printed by the heads 12C, 12M, 12Y and 12K for the respective colors, and the ejection of each head is determined. The ejection determination includes the presence of the ejection, measurement of the dot size, and measurement of the dot deposition position.

The printed matter generated in this manner is output from the paper output unit 26. The target print (i.e., the result of printing the target image) and the test print are preferably output separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, the paper output unit 26A for the target prints is provided with a sorter for collecting prints according to print orders.

Configuration of Print Unit

As shown in FIG. 1, the print unit 12 has a configuration including the treatment liquid head 12SA for the treatment liquid (SA), the inkjet heads 12C, 12M, 12Y, and 12K for the cyan, magenta, yellow, and black colored inks, and the coating roller 12SB for the post-treatment liquid (SB). Hereinafter, the treatment liquid head 12SA and the inkjet heads 12C, 12M, 12Y, and 12K are sometimes referred to merely as the “head”, such as the “head 12SA”.

Each of the heads 12SA, 12C, 12M, 12Y, and 12K of the print unit 12 is a full line type head that has a length corresponding to the maximum width of the recording medium 16 that may be used in the inkjet recording apparatus 10, and has a plurality of nozzles for ink ejection arranged in the nozzle surface at least over a length exceeding one side of the recording medium of the maximum size (i.e., the whole width of the area over which an image may be formed) (see FIG. 2).

The heads 12SA, 12C, 12M, 12Y, and 12K are disposed in the order, treatment liquid (SA), cyan (C), magenta (M), yellow (Y), and black (K) from upstream to downstream in the conveyance direction of the recording medium 16 (the paper conveyance direction shown in FIG. 2). Each of the heads 12SA, 12C, 12M, 12Y, and 12K is fixed to extend in a direction substantially orthogonal to the paper conveyance direction.

The treatment liquid (SA) and the various colored inks are ejected from the heads 12SA, 12C, 12M, 12Y, and 12K while the recording medium 16 is conveyed by the suction belt conveyance unit 22, whereby a color image can be formed on the recording medium 16.

By adopting a configuration in which the full line heads 12SA, 12C, 12M 12Y, 12K having nozzle rows covering the full paper width are provided for the respective colors in this way, it is possible to record an image on the full surface of the recording medium 16 by performing just one operation of relatively moving the recording medium 16 and the printing unit 12 in the paper conveyance direction (the sub-scanning direction), in other words, by means of a single sub-scanning action. Higher-speed printing is thereby made possible and productivity can be improved in comparison with a shuttle type head configuration in which a head reciprocates in a direction perpendicular to the paper conveyance direction.

Although the configuration with the KCMY four standard colors is described in the present embodiment, combinations of the ink colors and the number of colors are not limited to that. Light inks, dark inks or special color inks can be added as required. For example, a configuration is possible in which inkjet heads for ejecting light-colored inks such as light cyan and light magenta or dark-colored inks such as dark yellow are added. Furthermore, there are no particular restrictions of the sequence in which the heads of respective colors are arranged.

Moreover, a plurality of treatment liquid heads for a plurality of treatment liquids (e.g., treatment liquids having different values of a physical property such as viscosity, or treatment liquids having different compositions, etc.) may be provided, or a configuration may be adopted in which such a plurality of treatment liquids can be ejected from a single head.

Structure of Head

Next, the structure of a head is described below. The heads 12C, 12M, 12Y and 12K of the ink colors have the same structure, and a reference numeral 50 is hereinafter designated to any of the heads.

Figure 3A:
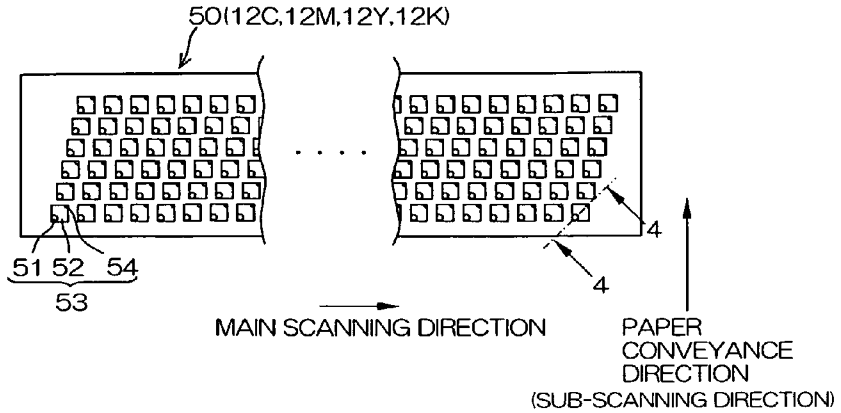
FIGS. 3A to 3C are plan see-through views showing examples of the structure of a print head.
Figure 3B:
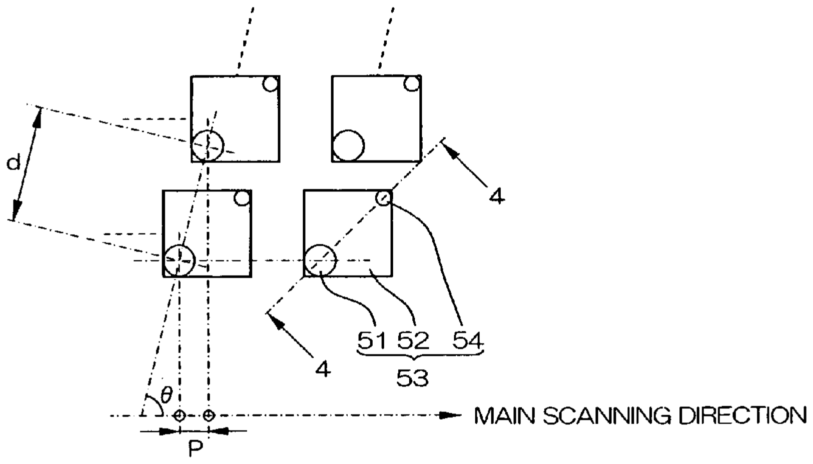
Figure 3C:
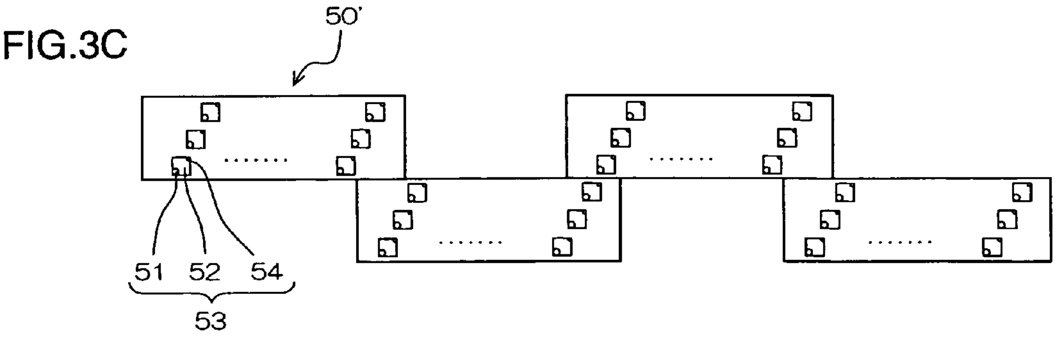
Figure 4:
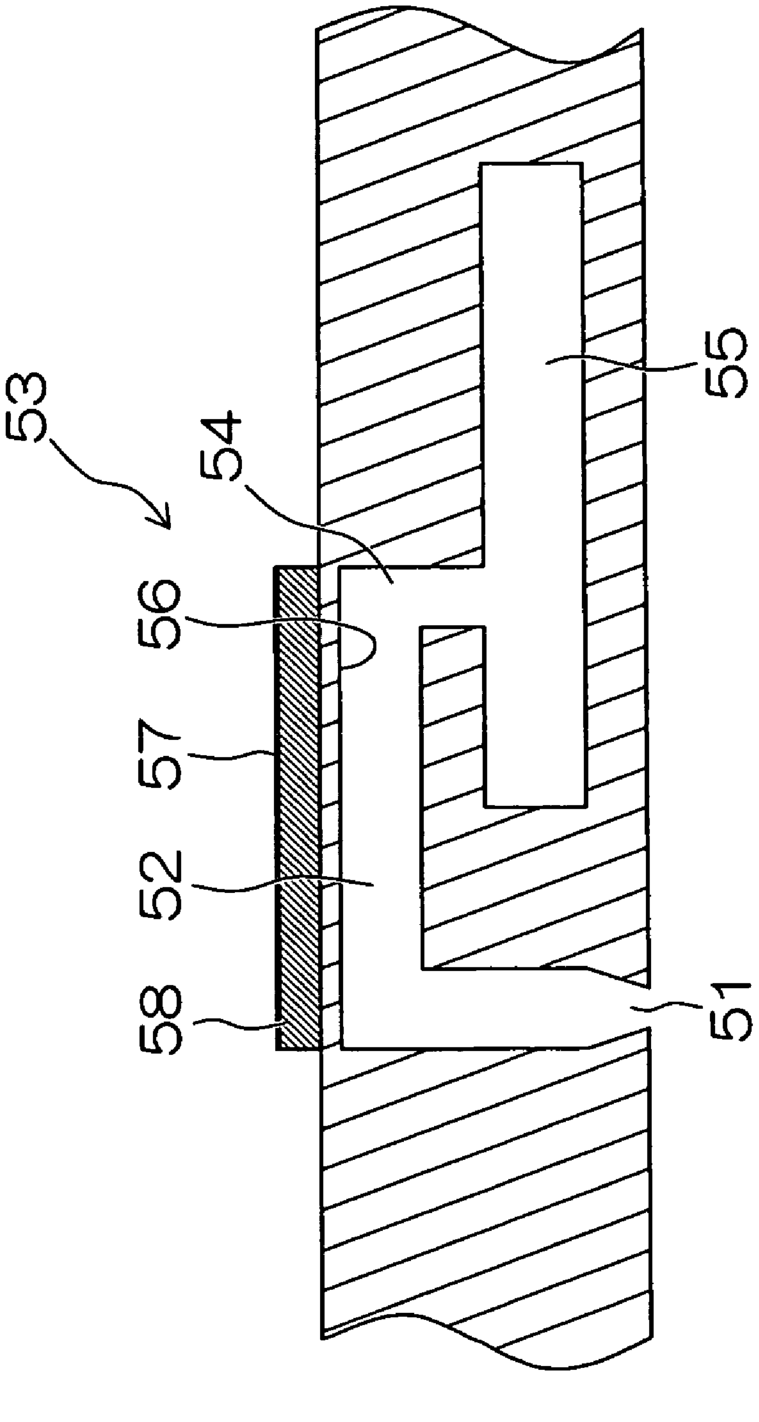
FIG. 4 is a sectional view along line 4-4 in FIGS. 3A and 3B.

FIG. 3A is a perspective plan view showing an example of the configuration of the head 50, FIG. 3B is an enlarged view of a portion thereof, FIG. 3C is a perspective plan view showing another example of the configuration of the head 50, and FIG. 4 is a cross-sectional view taken along the line 4-4 in FIGS. 3A and 3B, showing the inner structure of an ink chamber unit.

The nozzle pitch in the head 50 is required to be minimized in order to maximize the density of the dots printed on the surface of the recording medium 16. As shown in FIGS. 3A and 3B, the head 50 according to the present embodiment has a structure in which a plurality of ink chamber units 53, each comprising a nozzle 51 forming an ink droplet ejection port, a pressure chamber 52 corresponding to the nozzle 51, and the like, are disposed two-dimensionally in the form of a staggered matrix, and hence the effective nozzle interval (the projected nozzle pitch) as projected in the lengthwise direction of the head (the main scanning direction perpendicular to the paper conveyance direction) is reduced and high nozzle density is achieved.

The mode of forming one or more nozzle rows through a length corresponding to the entire width of the recording medium 16 in the main scanning direction is not limited to the example described above. For example, instead of the configuration in FIG. 3A, as shown in FIG. 3C, a line head having nozzle rows of a length corresponding to the entire width of the recording medium 16 can be formed by arranging and combining, in a staggered matrix, short head blocks 50' having a plurality of nozzles 51 arrayed in a two-dimensional fashion.

The pressure chamber 52 provided corresponding to each of the nozzles 51 is approximately square-shaped in plan view, and a nozzle 51 and a supply port 54 are provided respectively at either corner of a diagonal of the pressure chamber 52. Each pressure chamber 52 is connected via the supply port 54 to a common flow channel 55. The common channel 55 is communicated to an ink supply tank (ink supply source) (not shown in FIGS. 3A to 3C, shown as reference numeral 60 in FIG. 6). The ink supplied from the ink supply tank is distributed into the pressure chambers 52 via the common channel 55 as shown in FIG. 4.

An actuator 58 provided with an individual electrode 57 is joined to a pressure plate 56 which forms the upper face of the pressure chamber 52 and also serves as a common electrode, and the actuator 58 is deformed when a drive voltage is supplied to the individual electrode 57, thereby causing ink to be ejected from the nozzle 51. When ink is ejected, new ink is supplied to the pressure chamber 52 from the common flow passage 55, via the supply port 54.

A piezoelectric element using a ceramic material such as PZT ($Pb(Zr.Ti)O_3$, lead zirconate titanate) can be suitably used as the actuator 58 shown in FIG. 4. A piezoelectric element using a fluororesin material such as PVDF (polyvinylidene fluoride) or PVDF-TrFE (a polyvinylidene fluoride-trifluoroethylene copolymer) can of course also be used.

As shown in FIG. 3B, the high-density nozzle head according to the present embodiment is achieved by arranging a plurality of ink chamber units 53 having the above-described structure in a lattice fashion based on a fixed arrangement pattern, in a row direction which corresponds to the main scanning direction, and a column direction which is inclined at a fixed angle of θ with respect to the main scanning direction, rather than being perpendicular to the main scanning direction.

More specifically, by adopting a structure in which a plurality of ink chamber units 53 are arranged at a uniform pitch d in line with a row direction forming an angle of θ with respect to the main scanning direction, the pitch P of the nozzles projected so as to align in the main scanning direction is d×cos θ, and hence the nozzles 51 can be regarded to be equivalent to those arranged linearly at a fixed pitch P in the main scanning direction. Such configuration results in a nozzle row having a high nozzle density.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording medium (the main scanning direction) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 51 arranged in a matrix such as that shown in FIGS. 3A and 3B are driven, the main scanning according to the above-described (3) is preferred.

On the other hand, "sub-scanning" is defined as to repeatedly perform printing of one line (a line formed of a row of dots, or a line formed of a plurality of rows of dots) formed by the main scanning, while moving the full-line head and the recording medium 16 relatively to each other.

In other words, the nozzles 51 that eject ink droplets that become dots formed such that adjacent dots overlap one another on the recording medium 16 are arranged along a row direction that is at an angle θ to the main scanning direction. Note, however, that the nozzle arrangement when implementing the present invention is not limited to the example shown.

Description of Coating Roller

Figure 5:
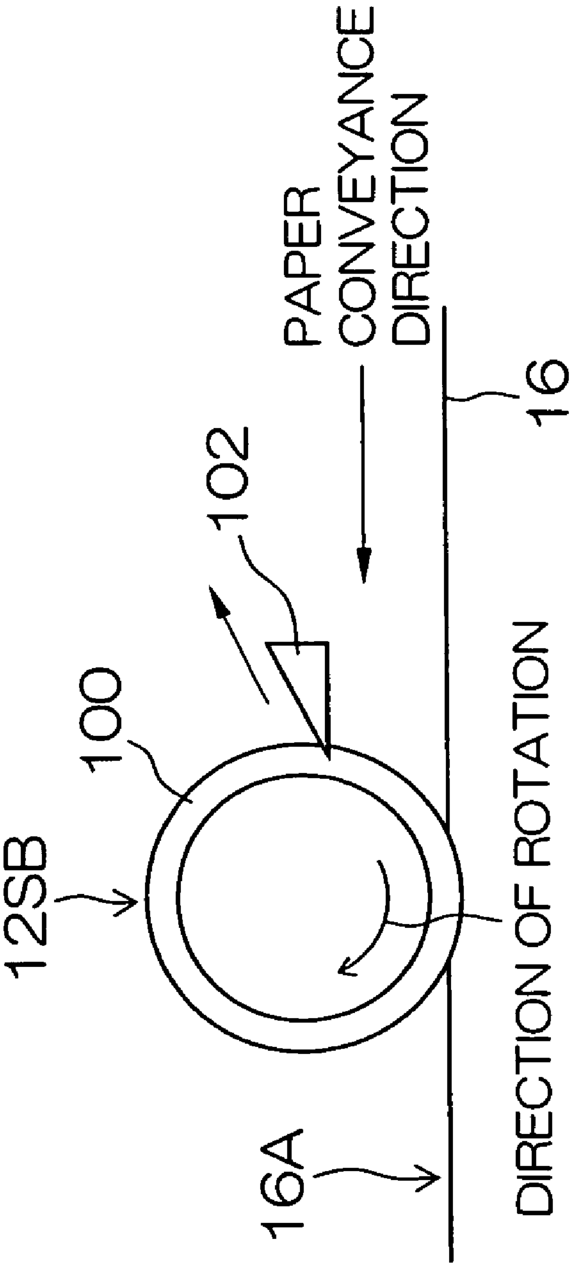
FIG. 5 is a structural drawing showing the structure of a coating roller of the inkjet recording apparatus shown in FIG. 1.

FIG. 5 is a schematic drawing explaining the configuration of the coating roller 12SB. The coating roller 12SB shown in FIG. 5 has a hard porous material 100 on a surface thereof (the surface that is in contact with the recording medium 16), and is configured such as to rotate in the direction of rotation shown in FIG. 5 (shown by the arrow) in relation to the movement of the recording medium 16 in the paper conveyance direction. The configuration is such that post-treatment liquid (SB) which has been impregnated into the hard porous material 100, is made to exude out from the interior of the hard porous material 100 through the hard porous material 100 by bringing the rotated coating roller 12SB into contact with (pushing the rotated coating roller 12SB against) a surface 16A of the recording medium 16 on which an image is to be formed, whereby the post-treatment liquid (SB) is applied to the recording medium 16.

Moreover, the coating roller 12SB is provided with a cleaning member 102 that removes dirt attached to the surface of the coating roller 12SB and post-treatment liquid (SB) remaining on the surface of the coating roller 12SB after the coating of the post-treatment liquid (SB) onto the recording medium 16. Dirt and residual post-treatment liquid (SB) attached to the coating roller 12SB, and waste liquid such as post-treatment liquid (SB) that has become solidified on the surface of the coating roller 12SB are removed by the cleaning member 102.

Note that in FIG. 2, a coating roller 12SB having a length corresponding to the width of the recording medium 16 is shown, but it is also possible to use a combination of a plurality of coating rollers each having a length shorter than the width of the recording medium 16 so as to cover the width of the recording medium 16.

Description of Supply System

Figure 6:
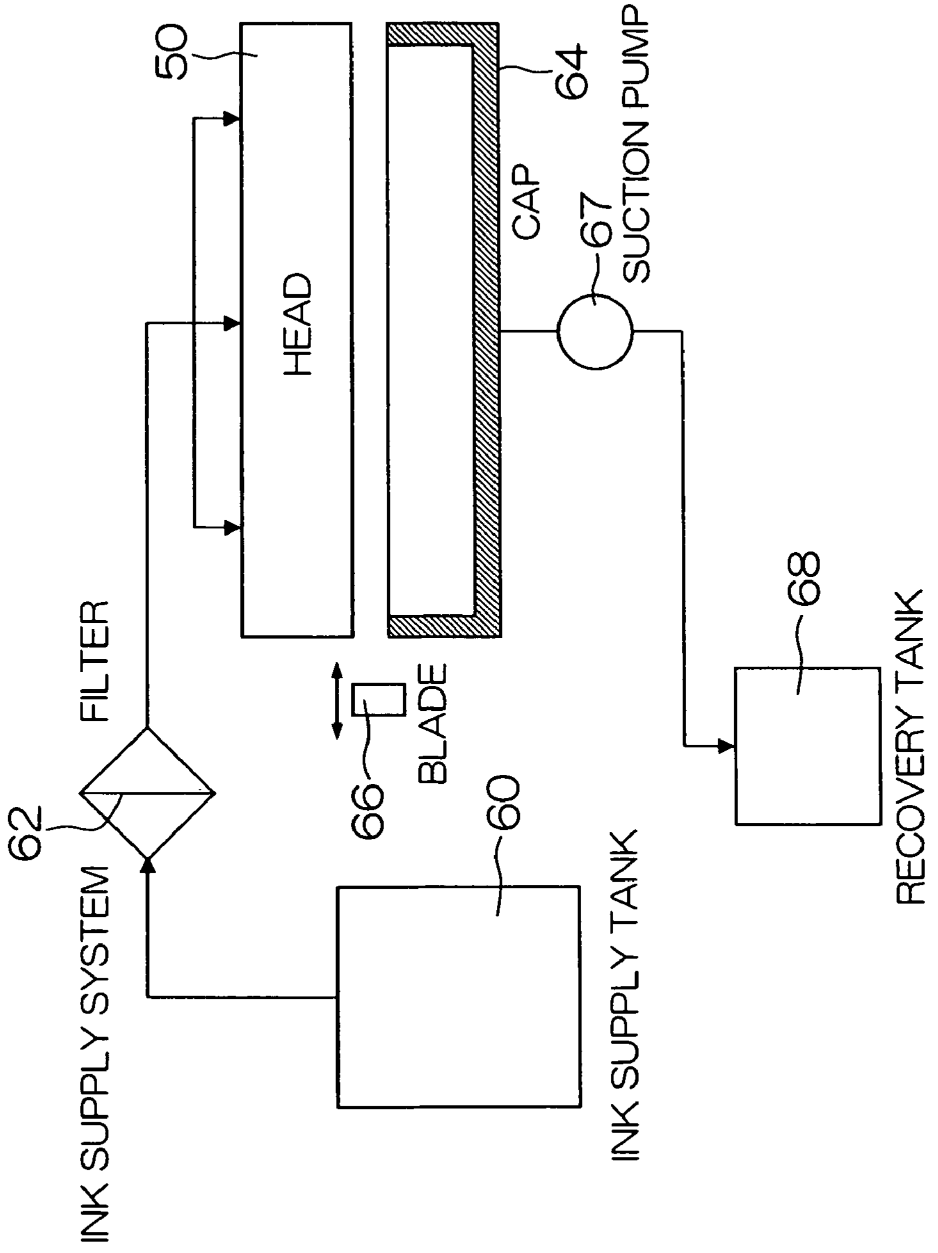
FIG. 6 is a conceptual drawing showing the configuration of an ink supply system and a treatment liquid supply system in the inkjet recording apparatus shown in FIG. 1.

FIG. 6 is a schematic drawing showing the configuration of the supply system of ink and treatment liquid in the inkjet recording apparatus 10.

The ink supply tank 60 is a base tank that supplies ink and is set in the ink storing and loading unit 14 described with reference to FIG. 1. The aspects of the ink supply tank 60 include a refillable type and a cartridge type: when the remaining amount of ink is low, the ink supply tank 60 of the refillable type is filled with ink through a filling port (not shown) and the ink supply tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type.

A filter 62 for removing foreign matters and bubbles is disposed between the ink supply tank 60 and the print head 50 as shown in FIG. 6. The filter mesh size in the filter 62 is preferably equivalent to or less than the diameter of the nozzle and commonly about 20 μm.

Although not shown in FIG. 6, it is preferable to provide a sub-tank integrally to the print head 50 or nearby the print head 50. The sub-tank has a damper function for preventing variation in the internal pressure of the head and a function for improving refilling of the print head.

The inkjet recording apparatus 10 is also provided with a cap 64 as a device to prevent the nozzles 51 from drying out or to prevent an increase in the ink viscosity in the vicinity of the nozzles 51, and a cleaning blade 66 as a device to clean the nozzle face.

A maintenance unit including the cap 64 and the cleaning blade 66 can be relatively moved with respect to the print head 50 by a movement mechanism (not shown), and is moved from a predetermined holding position to a maintenance position below the print head 50 as required.

The cap 64 is displaced up and down relatively with respect to the print head 50 by an elevator mechanism (not shown). When the power of the inkjet recording apparatus 10 is turned OFF or when in a print standby state, the cap 64 is raised to a predetermined elevated position so as to come into close contact with the print head 50, and the nozzle face is thereby covered with the cap 64.

During printing or standby, if the use frequency of a particular nozzle 51 is low, and if a state of not ejecting ink continues for a prescribed time period or more, then the viscosity of the ink increases. In a situation of this kind, it will become impossible to eject ink from the nozzle 51, even if the actuator 58 is operated.

Therefore, before a situation of this kind develops (namely, while the ink is within a range of viscosity which allows it to be ejected by operation of the actuator 58), the actuator 58 is operated, and a preliminary ejection ("purge", "blank ejection", "liquid ejection" or "dummy ejection") is carried out toward the cap 64 (ink receptacle), in order to expel the degraded ink (namely, the ink in the vicinity of the nozzle which has increased viscosity).

Furthermore, if air bubbles enter into the ink inside the print head 50 (inside the pressure chamber 52), then even if the actuator 58 is operated, it will not be possible to eject ink from the nozzle. In a case of this kind, the cap 64 is placed on the print head 50, the ink (ink containing air bubbles) inside the pressure chamber 52 is removed by suction, by means of a suction pump 67, and the ink removed by suction is then supplied to a recovery tank 68.

This suction operation is also carried out in order to remove degraded ink having increased viscosity (hardened ink), when ink is loaded into the head for the first time, and when the head starts to be used after having been out of use for a long period of time. Since the suction operation is carried out with respect to all of the ink inside the pressure chamber 52, the ink consumption is considerably large. Therefore, desirably, preliminary ejection is carried out when the increase in the viscosity of the ink is still minor.

In particular, in the case of handling a high-viscosity liquid, there may be an increased probability of an ejection abnormality occurring in a nozzle 51 due to the liquid solidifying (semi-solidifying) inside the nozzle 51, and hence in this case it is preferable to carry out a maintenance operation such as preparatory ejection or suction more frequently than in the case of handling a low-viscosity liquid.

The cleaning blade 66 is composed of rubber or another elastic member, and can slide on the ink ejection surface (surface of the nozzle plate) of the print head 50 by means of a blade movement mechanism (wiper) which is not shown. When ink droplets or foreign matter has adhered to the nozzle plate, the surface of the nozzle plate is wiped and cleaned by sliding the cleaning blade 66 on the nozzle plate. When the soiling on the ink ejection surface is cleaned away by the blade mechanism, a preliminary ejection is carried out in order to prevent the foreign matter from becoming mixed inside the nozzle 51 by the blade.

Moreover, although not shown, the inkjet recording apparatus 10 has a treatment liquid supply tank in which the post-treatment liquid (SB) supplied to the coating roller 12SB shown in FIG. 1 is stored. This treatment liquid supply tank and the coating roller 12SB shown in FIG. 1 are connected together by a pipeline (not shown), and a filter (not shown) similar to that in the ink supply system shown in FIG. 6 is provided in the midpoint of this pipeline.

Figure 7:
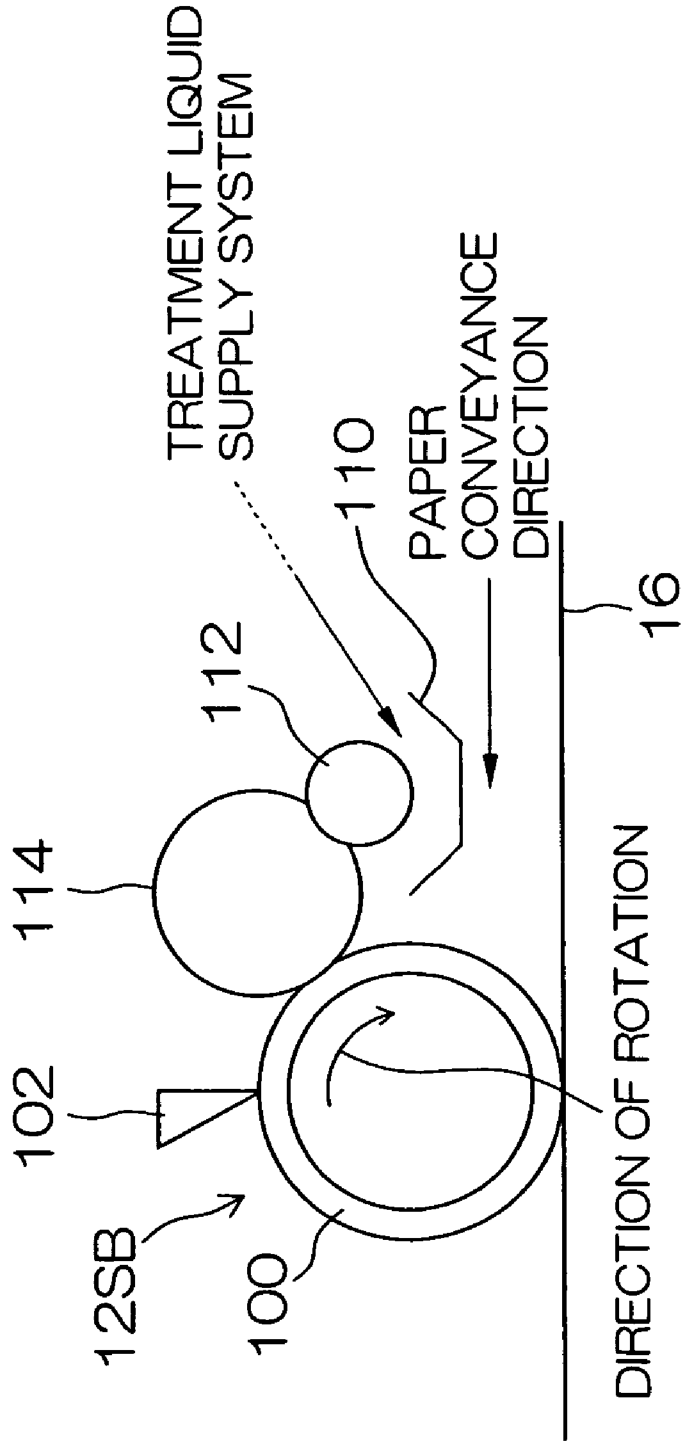
FIG. 7 is a conceptual drawing showing the configuration of a post-treatment liquid supply system in the inkjet recording apparatus shown in FIG. 1.

FIG. 7 shows an example of the configuration for supplying the post-treatment liquid (SB) to the coating roller 12SB. As shown in FIG. 7, the post-treatment liquid (SB) supplied to the coating roller 12SB from the treatment liquid supply system is temporarily stored in an intermediate treatment liquid storage unit 110. The post-treatment liquid (SB) stored in the intermediate treatment liquid storage unit 110 is transferred to the coating roller 12SB via intermediate rollers 112 and 114. The intermediate rollers 112 and 114 each have a porous material thereon, and a member having a lower absorbing ability than the hard porous material 100 provided on the surface of the coating roller 12SB is used as the porous material of each of the intermediate rollers 112 and 114.

Description of Control System

Figure 8:
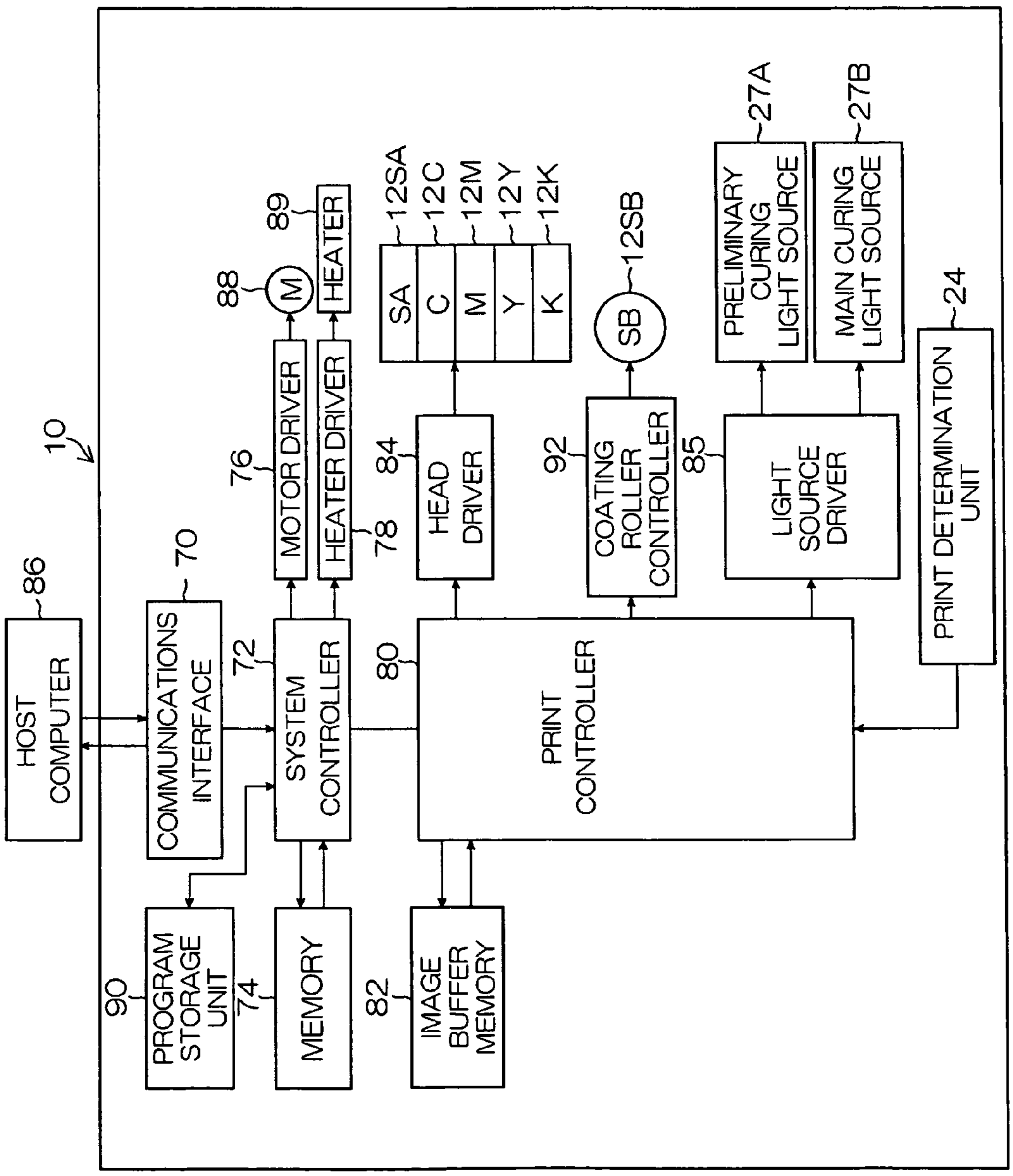
FIG. 8 is a principal block diagram showing the system configuration of the inkjet recording apparatus shown in FIG. 1.

FIG. 8 is a principal block diagram showing the system configuration of the inkjet recording apparatus 10. The inkjet recording apparatus 10 comprises a communications interface 70, a system controller 72, a memory 74, a motor driver 76, a heater driver 78, a print controller 80, an image buffer memory 82, a head driver 84, a light source driver 85 and the like.

The communications interface 70 is an interface unit for receiving image data sent from a host computer 86. A serial interface such as USB, IEEE1394, Ethernet, wireless network, or a parallel interface such as a Centronics interface may be used as the communications interface 70. A buffer memory (not shown) may be mounted in this portion in order to increase the communication speed. The image data sent from the host computer 86 is received by the inkjet recording apparatus 10 through the communications interface 70, and is temporarily stored in the memory 74.

The memory 74 is a storage device for temporarily storing images inputted through the communications interface 70, and data is written and read to and from the memory 74 through the system controller 72. The memory 74 is not limited to a memory composed of semiconductor elements, and a hard disk drive or another magnetic medium may be used.

The system controller 72 is constituted by a central processing unit (CPU) and peripheral circuits thereof, and the like, and it functions as a control device for controlling the whole of the inkjet recording apparatus 10 in accordance with a prescribed program, as well as a calculation device for performing various calculations. More specifically, the system controller 72 controls the various sections, such as the communications interface 70, memory 74, motor driver 76, heater driver 78, and the like, as well as controlling communications with the host computer 86 and writing and reading to and from the memory 74, and it also generates control signals for controlling the motor 88 of the conveyance system and heater 89 of the post-drying unit 42.

The program executed by the CPU of the system controller 72 and the various types of data which are required for control procedures are stored in the memory 74. The memory 74 may be a non-writeable storage device, or it may be a rewriteable storage device, such as an EEPROM. The memory 74 is used as a temporary storage region for the image data, and it is also used as a program development region and a calculation work region for the CPU.

The motor driver (drive circuit) 76 drives the motor 88 in accordance with commands from the system controller 72. The heater driver 78 is a driver that drives heaters 89 such as a heater for the post-drying unit 42 and heaters for adjusting the temperature inside the inkjet recording apparatus 10 and inside the heads 50 in accordance with instructions from the system controller 72.

The print controller 80 has a signal processing function for performing various tasks, compensations, and other types of processing for generating print control signals from the image data stored in the memory 74 in accordance with commands from the system controller 72 so as to supply the generated print data (dot data) to the head driver 84. Prescribed signal processing is carried out in the print controller 80, and the ejection amount and the ejection timing of the treatment liquid droplets and the ink droplets from the respective print heads 50 are controlled via the head driver 84, on the basis of the print data. By this means, desired dot size and dot positions can be achieved.

The print controller 80 is provided with the image buffer memory 82; and image data, parameters, and other data are temporarily stored in the image buffer memory 82 when image data is processed in the print controller 80. Also possible is an aspect in which the print controller 80 and the system controller 72 are integrated to form a single processor.

The head driver 84 drives the actuators 58 of the treatment liquid head 12SA, the heads 12C, 12M, 12Y, and 12K for the various colors, and a transparent ink head 12T on the basis of the printing data supplied from the print controller 80. The head driver 84 may include a feedback control system for keeping the head driving conditions constant.

The light source driver 85 functions as a control block that controls power-on/power-off (the irradiation timing and the irradiation duration), the irradiation dose, and so on for the preliminary curing light source 27A and the main curing light source 27B shown in FIG. 1. That is, the light source driver 85 controls power-on/power-off for the preliminary curing light source 27A and the main curing light source 27B, and also sets the irradiation dose for the preliminary curing light source 27A and the main curing light source 27B, on the basis of control signals supplied from the print controller 80.

The image data to be printed is externally inputted through the communications interface 70, and is stored in the memory 74. In this stage, the RGB image data is stored in the memory 74.

The image data stored in the memory 74 is sent to the print controller 80 via the system controller 72, and is converted into dot data for the treatment liquid (SA) and dot data for each of the colored inks in the print controller 80. That is, the print controller 80 carries out processing of converting the inputted RGB image data into dot data for the treatment liquid (SA) and the four colors CMYK. The dot data produced by the print controller 80 is stored in the image buffer memory 82.

The head driver 84 produces drive control signals for the heads 50 on the basis on the dot data stored in the image buffer memory 82. The drive control signals produced by the head driver 84 are applied to the heads 50, whereby droplets of the treatment liquid (SA) and the colored inks are ejected from the heads 50. The ejection of droplets from the heads 50 is controlled in synchronization with the speed of conveyance of the recording medium 16, whereby an image is formed on the recording medium 16.

The dots formed from the treatment liquid (SA) should contact the colored inks corresponding to the treatment liquid (SA) dots, and hence the dot size for the treatment liquid (SA) may be made to be larger than the dot size for the colored inks, and moreover the density of the treatment liquid (SA) dots may be made to be lower than the density of the colored ink dots.

That is, the dot data for the treatment liquid (SA) and the dot data for the colored inks may be produced such that the dot data for the treatment liquid (SA) is different to the dot data for the colored inks.

Moreover, the print controller 80 sends control signals to a coating roller controller 92 which controls the coating roller 12SB that applies the post-treatment liquid (SB) to the recording medium 16. Based on the control signals sent from the print controller 80, the coating roller controller 92 carries out on/off control of the coating roller 12SB (controls the timing of the coating roller 12SB being turned on and off, the on duty, the pressure applied, etc.) and controls the supply of the treatment liquid to the coating roller 12SB (the timing of the supply, the amount supplied) and cleaning of the coating roller 12SB.

Various control programs are stored in a program storage unit 90 shown in FIG. 8. The control programs are read out and executed in accordance with instructions from the system controller 72. The program storage unit 90 may use a semiconductor memory such as a ROM or an EEPROM, or may use a magnetic disk or the like. An external interface may be provided, and a memory card or a PC card may be used. A plurality of these storage media may of course be provided. Moreover, the program storage unit 90 may also be used as a recording device (not shown) for operational parameters and so on.

In the present example, the system controller 72, the memory 74, the print controller 80 and so on have been shown as individual functional blocks, but a configuration may also be adopted in which these are integrated together to form a single processor. Moreover, some of the functions of the system controller 72 and some of the functions of the print controller 80 may be achieved using a single processor.

Description of Image Formation Control

Next, a description is given of image formation control (droplet ejection control for the treatment liquid and the colored inks, and coating control for the post-treatment liquid) for the inkjet recording apparatus 10 according to an embodiment of the present invention. The configuration is such that the treatment liquid (SA) used in the inkjet recording apparatus 10 according to the present embodiment contains a polymerization initiator, a diffusion preventing agent, and an oil (organic solvent), and each colored ink contains a UV monomer (ultraviolet radiation-curable monomer), and a pigment (ink coloring material). Through this combination of the treatment liquid (SA) and the colored inks, image degradation due to deposition interference can be avoided primarily through the action of the diffusion preventing agent contained in the treatment liquid (SA), and moreover even in the case where leaked light from the preliminary curing light source 27A or reflected light from the recording medium 16 reaches the nozzles of the treatment liquid head 12SA and the inkjet heads 12C, 12M, 12Y, and 12K, polymerization does not occur since none of the liquids contains both a polymerization initiator and a UV monomer together, whereby solidification of the treatment liquid (SA) and the colored inks in the nozzles of the respective heads can be prevented.

Note that, each colored ink may contain a UV oligomer or an ultraviolet radiation-curable polymerizable compound such as a mixture of a UV monomer and a UV oligomer, instead of, or as well as, the UV monomer.

Upon the treatment liquid (SA) and the colored inks on the recording medium 16 being irradiated with UV from the preliminary curing light source 27A shown in FIG. 1, radicals are generated from the polymerization initiator contained in the treatment liquid (SA), whereby polymerization of the UV monomer(s) (ultraviolet radiation-curable monomer(s)) contained in the colored inks occurs, so that the image (dots) formed from the colored inks is (are) put into a cured (or semi-cured) state.

The "semi-cured state" here refers to a state in which the dots formed on the recording medium 16 are cured to an extent such that the dots do not move, or a state in which at least the surface of each of the ink droplets is cured (i.e., a cured film is formed on the surface of each of the ink droplets), so that the curing has taken place to an extent that uniting with other ink droplets does not occur.

That is, the preliminary curing by the preliminary curing light source 27A is preferably such that the treatment liquid (SA) and the colored inks are cured to form dots to an extent that there is no problem in the subsequent coating on of the post-treatment liquid (SB).

Figure 9A:
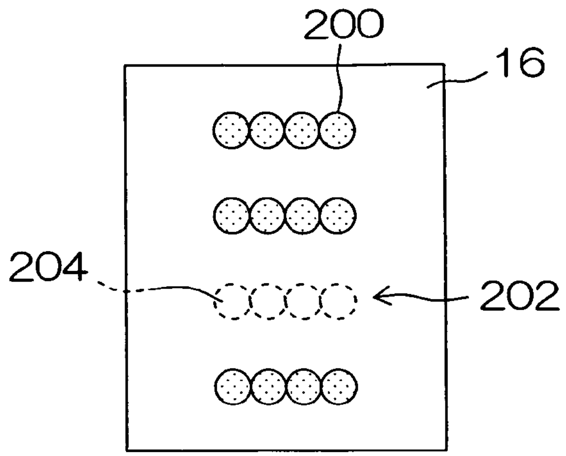
FIGS. 9A to 9C are drawings for explaining droplet ejection control in the inkjet recording apparatus shown in FIG. 1.

FIG. 9A shows dots 200 (shown by full lines) formed on the recording medium 16 by the treatment liquid. If an ejection abnormality (non-ejection, ejection amount abnormality, flying direction abnormality) occurs in some of the nozzles of the treatment liquid head 12SA, then missing dots 202 can arise as shown in FIG. 9A. In the present example, a full line type ejection head as shown in FIG. 2 is used as the treatment liquid head 12SA, and with such a full line type ejection head, if an ejection abnormality occurs in one nozzle, then missing dots arise in the paper conveyance direction. Note that reference numeral 204 shown by the broken line in FIG. 9A shows the dots that should have been formed by the treatment liquid (SA) during normal ejection.

Figure 9B:
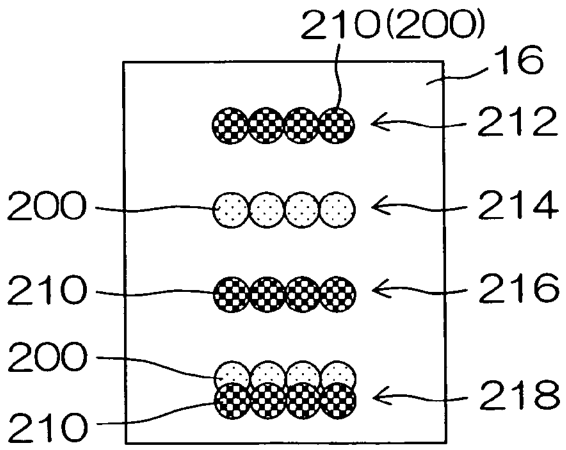

Moreover, FIG. 9B shows dots 210 formed on the recording medium 16 by the colored inks (shown by diagonally hatched circles). With the droplet ejection control shown in the present example, droplets of the colored inks are deposited onto the dots formed by the treatment liquid (SA). A dot row shown in FIG. 9B is a dot row due to a colored ink being deposited onto the dots 200 formed by the treatment liquid.

A dot row 214 is a dot row constituted from only the dots 200 of the treatment liquid (SA), due to non-ejection from the head 12C, 12M, 12Y, or 12K occurring so that the dots 210 of the colored ink are not formed; and a dot row 216 is a dot row formed from only a colored ink in the positions of the missing dots of the treatment liquid (SA) shown in FIG. 9A. Furthermore, a dot row 218 is a dot row of a colored ink formed in positions different to the positions where the dots of the colored ink are normally formed, due to a flying direction abnormality of the head 12C, 12M, 12Y, or 12K occurring.

That is, the dot row 212 is a normal dot row formed by the dots 200 of the treatment liquid and the dots 210 of the colored ink. In the dot row 212, the treatment liquid (SA) and the colored ink are cured (semi-cured) by being irradiated with UV from the preliminary curing light source 27A, whereby desired dots are formed.

On the other hand, the dot rows 214 and 216 are respectively dot rows comprising only the dots 200 of the treatment liquid (SA) or only the dots 210 of a colored ink, due to non-ejection from the head 12C, 12M, 12Y, or 12K, or non-ejection from the treatment liquid head 12SA, and hence the treatment liquid (SA) or the colored ink is not cured even when the UV irradiation is performed by the preliminary curing light source 27A, and remains on the recording medium 16 in such a state.

Moreover, the dot row 218 is a dot row for which misalignment of the dots 210 of a colored ink has arisen due to a flying direction abnormality of the head 12C, 12M, 12Y, or 12K (i.e., there is a displacement in the positions of formation between the dots 200 of the treatment liquid (SA) and the dots 210 of the colored ink). In the dot row 218, curing (semi-curing) does take place through the UV irradiation by the preliminary curing light source 27A in areas where the treatment liquid (SA) and the colored ink are in contact, but some of the treatment liquid (SA) and some of the colored ink do not undergo the curing reaction but rather remain on the recording medium 16 in such a state.

In the inkjet recording apparatus 10 shown in the present example, the post-treatment liquid (SB) is applied over the whole surface of the recording medium 16 by the coating roller 12SB after the preliminary curing, and then the recording medium 16 is irradiated with UV by the main curing light source 27B.

The post-treatment liquid (SB) contains a polymerization initiator and a UV monomer, and hence treatment liquid remaining on the recording medium 16 and the UV monomer in the post-treatment liquid (SB) make contact with one another, and colored ink remaining on the recording medium 16 and the polymerization initiator in the post-treatment liquid (SB) make contact with one another, and then UV irradiation is performed by the main curing light source 27B, whereby polymerization occurs between these, so that dots 200 of the treatment liquid (SA) alone and dots 210 of a colored ink alone are cured.

Figure 9C:
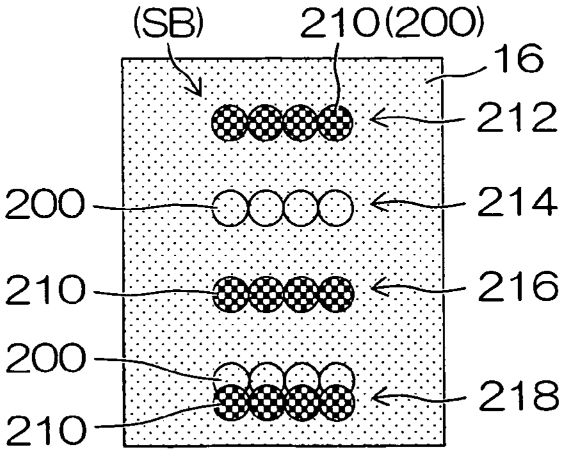

For example, for the dot row 214 formed from the treatment liquid (SA) alone shown in FIG. 9C, the UV monomer that should have been deposited from the inkjet head 12C, 12M, 12Y, or 12K is lacking, but is compensated for by the UV monomer in the post-treatment liquid (SB), whereby upon the UV irradiation being performed by the main curing light source 27B, radicals are generated from the polymerization initiator contained in the treatment liquid (SA) or the post-treatment liquid (SB), and curing occurs through the polymerization. Moreover, for the dot row 216 formed from a colored ink alone, the polymerization initiator that should have been deposited from the treatment liquid head 12SA is lacking, but is compensated for by the polymerization initiator in the post-treatment liquid (SB), whereby upon the UV irradiation being performed by the main curing light source 27B, radicals are generated from the polymerization initiator contained in the post-treatment liquid (SB), and curing occurs through the polymerization.

Furthermore, for the dot row 218 in which the dots 210 of the colored ink are displaced from the dots 200 of the treatment liquid (SA), in areas where the polymerization initiator is not present, the post-treatment liquid (SB) compensates for the polymerization initiator, and in areas where the UV monomer is not present, the post-treatment liquid (SB) compensates for the UV monomer. Hence, upon the mixed liquid of the post-treatment liquid (SB) and the treatment liquid (SA) or the colored ink being irradiated with UV from the main curing light source 27B, radicals are generated from the polymerization initiator contained in the unreacted treatment liquid (SA) or the post-treatment liquid (SB), and curing occurs through polymerization.

Due to making the configuration be such that the post-treatment liquid (SB), which contains a polymerization initiator and a UV monomer, is applied to the recording medium by the coating roller 12SB, the problem of the post-treatment liquid (SB) curing in nozzles due to leaked light from the preliminary curing light source 27A or the main curing light source 27B or reflection from the recording medium 16, which would occur if the post-treatment liquid (SB) were ejected using an ejection head, does not occur. Furthermore, due to the post-treatment liquid (SB) being applied over the whole surface of the recording medium 16 by the coating roller (coating mechanism), the post-treatment liquid (SB) is applied in correspondence with undulations of the dots of the treatment liquid (SA) and the colored inks formed on the recording medium 16, and hence the recorded image is leveled, contributing to a reduction in an appearance of relief.

The post-treatment liquid (SB) preferably has a curing ability so that the treatment liquid (SA) and colored ink remaining on the recording medium 16 are completely cured. If the curing ability of the post-treatment liquid (SB) is increased, then the viscosity tends to increase, and if the viscosity of the post-treatment liquid (SB) is higher than a certain predetermined value, then ejection using an ejection head becomes difficult. Accordingly, with the inkjet recording apparatus 10 shown in the present example, a configuration is adopted in which the post-treatment liquid (SB) is applied using the coating roller 12SB, so that the post-treatment liquid (SB) can be deposited onto the recording medium 16 stably even in the case where the viscosity of the post-treatment liquid (SB) is higher than that certain predetermined value.

In other words, with the configuration in which the post-treatment liquid (SB) is applied to the recording medium 16 using the coating roller 12SB, it becomes possible to set the viscosity of the post-treatment liquid (SB) to be higher to an extent that the viscosity would not be suitable in the case of ejecting using an ejection head. Accordingly, the curing ability of the post-treatment liquid (SB) can be improved.

In the present example, a mode in which the post-treatment liquid (SB) is applied over the whole surface of the recording medium 16 has been described, but the post-treatment liquid (SB) may instead be selectively applied to an area including an area in which the treatment liquid has been deposited and an area in which the colored inks have been deposited.

Description of Treatment Liquid, Inks, and Post-Treatment Liquid (Ink Set)

Next, the ink set used in the inkjet recording apparatus 10 according to the present invention is described below in detail. In the inkjet recording apparatus 10 shown in the present example, there is used an ink set constituted from a treatment liquid (SA) containing at least one polymerization initiator, at least one diffusion preventing agent, and at least one oil, various colored inks each containing at least one polymerizable compound, and at least one coloring material, and a post-treatment liquid (SB) containing at least one polymerization initiator, and at least one polymerizable compound.

Polymerizable Compounds

In the present invention, it is an essential requirement that a polymerizable compound be contained in each of the colored inks and the post-treatment liquid (SB).

"Polymerizable compound" refers to a compound that has a capability of undergoing polymerization and hence curing through the action of initiating species such as radicals generated from a polymerization initiator, described below.

Each polymerizable compound is preferably an addition polymerization-undergoing compound having at least one ethylenic unsaturated double bond therein, and is preferably selected from polyfunctional compounds having at least one terminal ethylenic unsaturated bond, more preferably at least two terminal ethylenic unsaturated bonds, therein. The group of such compounds is widely known in the industrial field in question, and these compounds can be used with no particular limitations thereon. These compounds include, for example, ones having chemical forms such as monomers, and prepolymers, i.e. dimers, trimers and other oligomers, and mixtures or copolymers thereof.

The polymerizable compound preferably has a polymerizable group such as an acryloyl group, a methacryloyl group, an allyl group, a vinyl group, or an internal double bond group (maleic acid etc.) in the molecule thereof. Of these, a compound having an acryloyl group or a methacryloyl group is preferable since the curing reaction can be brought about with little energy.

In each liquid, one polymerizable compound only may be used, or a plurality of polymerizable compounds may be used in combination. Moreover, in the polymerizable compound-containing liquids (in the present example, the colored inks and the post-treatment liquid), the same polymerizable compound may be used, or different polymerizable compounds may be used; and from the standpoint of compatibility between the liquids, it is preferable to use the same polymerizable compound in the same liquid.

The polymerizable compound content in the non-colorant-containing liquid (the post-treatment liquid) is preferably in a range of 50 to 99% by mass, more preferably 70 to 99% by mass, yet more preferably 80 to 99% by mass.

The polymerizable compound content in each colorant-containing liquid (each colored ink) is preferably in a range of 50 to 99% by mass, more preferably 70 to 99% by mass, yet more preferably 80 to 99% by mass.

It is undesirable for the polymerizable compound content to be less than the above ranges, since then it may not be possible to carry out curing sufficiently. It is undesirable for the polymerizable compound content to be greater than the above ranges, since then it may not be possible to contain the colorant or a polymer etc., described below, in the required amount.

Polymerization Initiators

In the ink set used in the present invention, a polymerization initiator is contained in each of the treatment liquid and the post-treatment liquid as described above. "Polymerization initiator" refers to a compound that generates initiating species such as radicals through light, or heat, or both of these types of energy, thus initiating and promoting the polymerization of the polymerizable compound(s). A publicly known thermal polymerization initiator, a compound having therein a bond with low bond dissociation energy, a photopolymerization initiator, or the like can be selected and used.

From the viewpoint of stability over time, curability and curing rate, the polymerization initiator content is preferably 0.5 to 20% by mass, more preferably 1 to 15% by mass, yet more preferably 3 to 10% by mass, relative to all of the polymerizable compounds used in the ink set.

Polymerization and curing are brought about through energy being applied to the polymerizable compound(s) and the polymerization initiator(s) on the recording medium 16.

A polymerization initiator used in the present invention means a compound that generates initiating species such as radicals through the energy of an ultraviolet radiation (radiation), thus initiating and promoting the polymerization of the polymerizable compound(s). A publicly known thermal polymerization initiator, a compound having therein a bond with low bond dissociation energy, a photopolymerization initiator, or the like can be selected and used as a polymerization initiator in the present invention.

Examples of such radical generating agents include halogenated organic compounds, carbonyl compounds, organic peroxide compounds, azo type polymerization initiators, azide compounds, metallocene compounds, hexaarylbiimidazole compounds, organic borate compounds, disulfonic acid compounds, and onium salt compounds.

As a polymerization initiator, one having excellent sensitivity is preferable. For example, one that undergoes thermal decomposition at a temperature of 80° C. or below is undesirable from the standpoint of storage stability, and hence it is preferable to select a polymerization initiator that does not undergo thermal decomposition at temperatures up to 80° C.

One polymerization initiator may be used, or a plurality of polymerization initiators may be used in combination. Moreover, so long as there is no impairment of the effects of the present invention, the polymerization initiator(s) may be used together with a publicly known sensitizer with an object of improving the sensitivity.

Colorants

In the inkjet recording apparatus according to the present invention, as described above, the treatment liquid (SA) and the post-treatment liquid (SB) do not contain colorants, whereas the colored inks contain colorants.

There are no particular limitations on the colorants used in an embodiment of the present invention. So long as these colorants are such that a hue and color density suitable for the ink usage can be attained, ones selected as appropriate from publicly known water-soluble dyes, oil-soluble dyes and pigments can be used. Of these, from the viewpoint of ink droplet ejection stability and quick drying ability, the liquids constituting the inkjet recording inks in the present invention are preferably water-insoluble liquids not containing an aqueous solvent. From this viewpoint, it is preferable to use an oil-soluble dye or pigment that readily disperses or dissolves uniformly in the water-insoluble liquid.

The dye content in the case of using an oil-soluble dye as a colorant is preferably in a range of 0.05 to 20% by mass, more preferably 0.1 to 15% by mass, particularly preferably 0.2 to 6% by mass, in terms of solid content. Moreover, the content in the case of being contained in a liquid other than the second liquids (colored inks) is preferably in a range of 0 to 1% by mass in terms of solid content in the liquid.

A mode in which a pigment is used as a colorant is preferable from the viewpoint of aggregation readily occurring when the plurality of liquids are mixed together.

As pigments that can be used in the present invention, either organic pigments or inorganic pigments can be used. A carbon black pigment is preferable as a black pigment. In general, a black pigment, and pigments of the three primary colors, cyan, magenta and yellow, are used; however, pigments having other hues, for example red, green, blue, brown or white pigments, pigments having a metallic luster such as gold or silver pigments, uncolored or light body pigments, and so on may also be used in accordance with the object.

Moreover, particles obtained by fixing a dye or a pigment to the surface of a core material made of silica, alumina, a resin or the like, an insoluble lake pigment obtained from a dye, a colored emulsion, a colored latex, or the like may also be used as a pigment.

Furthermore, a resin-coated pigment may also be used. Such a resin-coated pigment is known as a "microcapsule pigment", and is commercially available from manufacturers such as Dainippon Ink and Chemicals Inc. and Toyo Ink Mfg. Co., Ltd.

From the viewpoint of the balance between the optical density and the storage stability, the volume average particle diameter of the pigment particles contained in a liquid in the present invention is preferably in a range of 30 to 250 nm, more preferably 50 to 200 nm. Here, the volume average particle diameter of the pigment particles can be measured, for example, using a measuring apparatus such as an LB-500 (made by HORIBA Ltd.).

From the viewpoint of the optical density and the ejection stability, the pigment content in the case of using a pigment as a colorant is preferably in a range of 0.1 to 20% by mass, more preferably 1 to 10% by mass, in terms of solid content in each colored ink. Moreover, in the case of a mode in which a colorant is contained in a liquid other than the colored inks, the colorant content is preferably in a range of 0 to 1% by mass in terms of solid content in the liquid.

One colorant only may be used, or a plurality of colorants may be used mixed together. Moreover, different colorants, or the same colorants, may be used in each of the liquids.

Diffusion Preventing Agents (Polymers Etc.)

In the ink set used in the inkjet recording apparatus of the present invention, of the above plurality of liquids, it is preferable for at least one liquid not containing a colorant (in the present example, the treatment liquid (SA)) to contain at least one selected from the group of polymers having an amino group, polymers having an onium group, polymers having a nitrogen-containing hetero ring-possessing, and metal compounds (hereinafter sometimes referred to as "polymers etc."). By providing a plurality of liquids satisfying these conditions, smearing and deposition interference can be suppressed yet more effectively. Note that the definition of "not containing a colorant" is as described in the above "Colorants" section.

One of the above polymers or the like may be used, or a plurality may be used in combination. "Plurality" includes both, for example, the case of polymers that are polymers having an amino group but have different structures to one another, and the case of different types such as a polymer having an amino group and a polymer having an onium group. Moreover, a combination selected from amino groups, onium groups, nitrogen-containing hetero rings, and metal compounds may be present together in one molecule.

Furthermore, a polymer etc. as above may be contained in one liquid only, or may be contained in a plurality of the liquids. Following is a detailed description of these polymers and so on.

Polymers Having an Amino Group

A homopolymer of an only monomer having an amino group, or a copolymer of a monomer of an amino group and another monomer may be used as a polymer having an amino group. The "monomer having an amino group" content in the polymer having an amino group is preferably not less than 10 mol % but not more than 100 mol %, more preferably not less than 20 mol % but not more than 100 mol %.

Examples of monomers having an amino group include N,N-dimethylaminoethyl (meth)acrylate, N,N-diethylaminoethyl (meth)acrylate, N,N-dimethylaminopropyl (meth) acrylate, N,N-diethylaminopropyl (meth)acrylate, N,N-dimethylaminoethyl (meth)acrylamide, N,N-diethylaminoethyl (meth)acrylamide, N,N-dimethylaminopropyl (meth)acrylamide, N,N-diethylaminopropyl (meth)acrylamide, diallylamine, N-methyldiallylamine, N-vinylbenzyl-N,N-dimethylamine, N-vinylbenzyl-N,N-diethylamine, N-vinylbenzyl-N-ethyl-N-methylamine, N-vinylbenzyl-N,N-dihexylamine, N-vinylbenzyl-N-octadecyl-N-methylamine, N-vinylbenzyl-N'-methyl-piperazine, N-vinylbenzyl-N'-(2-hydroxyethyl)-piperazine, N-benzyl-N-methylaminoethyl (meth)acrylate, and N,N-dibenzylaminoethyl (meth)acrylate.

Examples of monomers that can be copolymerized with these monomers include (meth)acrylic acid alkyl esters (e.g. (meth)acrylic acid alkyl esters having 1 to 18 carbon atoms in the alkyl part thereof such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, and stearyl (meth)acrylate), (meth)acrylic acid cycloalkyl esters (e.g. cyclohexyl (meth)acrylate, etc.), (meth)acrylic acid aryl esters (e.g. phenyl (meth)acrylate, etc.), (meth)acrylic acid aralkyl esters (e.g. benzyl (meth)acrylate, etc.), substituted (meth)acrylic acid alkyl esters (e.g. 2-hydroxyethyl (meth) acrylate, etc.), (meth)acrylamides (e.g. (meth)acrylamide, dimethyl (meth)acrylamide, etc.), aromatic vinyl compounds (e.g. styrene, vinyltoluene, α-methylstyrene, etc.), vinyl esters (e.g. vinyl acetate, vinyl propionate, vinyl versatate, etc.), allyl esters (e.g. allyl acetate, etc.), halogen-containing monomers (e.g. vinylidene chloride, vinyl chloride, etc.), vinyl cyanides (e.g. (meth)acrylonitrile, etc.), and olefins (e.g. ethylene, propylene, etc.).

Furthermore, other polymers having an amino group include polyallylamine, polyvinylamine, polyethyleneimine, polydiallylamine, poly(N-methyldiallylamine), poly(N-ethyldiallylamine), and modified compounds thereof (a benzyl chloride adduct, a phenyl glycidyl ether adduct, and an acrylonitrile adduct of polyallylamine), and polyadducts between a diisocyanate (e.g. hexamethylene diisocyanate, isophorone diisocyanate, toluene diisocyanate, or xylylene diisocyanate) and a diol having a tertiary amino group (e.g. N-methyldiethanolamine, N-ethyldiethanolamine, or N,N'-3-hydroxypropylpiperazine).

Of these, polyallylamine, polyvinylamine, polyethyleneimine, and modified compounds thereof are preferable, with a modified compound of polyallylamine being particularly preferable.

In the present invention, as a polymer having an amino group, a polymer having therein a unit represented by the following general formula (1) is particularly preferable.

(General Formula 1)

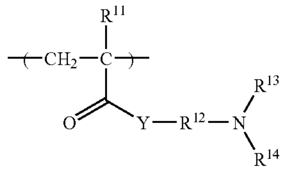

In general formula (1), $R^{11}$ represents hydrogen or a methyl group, Y represents O or $NR^{15}$, $R^{15}$ represents hydrogen or an alkyl group, $R^{12}$ represents a bivalent connecting group, and $R^{13}$ and $R^{14}$ each independently represents an alkyl group, an aralkyl group, or an aryl group.

Hydrogen is more preferable as $R^{11}$, O or NH is more preferable as Y, with O being yet more preferable, and an alkyl group or an aralkyl group is more preferable as each of $R^{13}$ and $R^{14}$, with an alkyl group being yet more preferable.

As the bivalent connecting group represented by $R^{12}$, an alkylene group or an arylene group is preferable, with an alkylene group being more preferable.

Specific examples of the bivalent connecting group include a methylene group, an ethylene group, a propylene group, a trimethylene group, a tetramethylene group, a hexamethylene group, an octamethylene group, a phenylene group, and a 2-hydroxypropylene group. Of these, an ethylene group, a propylene group, and a trimethylene group are preferable.

As an alkyl group represented by $R^{13}$, $R^{14}$ or $R^{15}$, an alkyl group having not more than 18 carbon atoms is preferable, with an alkyl group having not more than 12 carbon atoms being more preferable, and an alkyl group having not more than 8 carbon atoms being particularly preferable. The alkyl group may be straight chain, or cyclic, and may have substituents, examples of the substituents including a hydroxy group, alkoxy groups (e.g. a methoxy group, an ethoxy group, a propoxy group, etc.), aryloxy groups (e.g. a phenoxy group, etc.), amino groups, carbamoyl groups, and halogen atoms.

Preferable specific examples of polymers having units represented by the general formula (1) are as follows.

P1-1

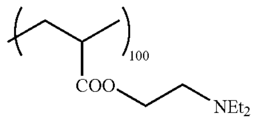

P1-2

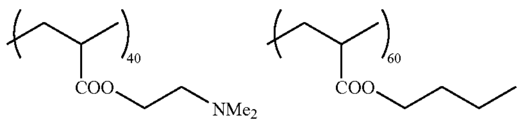

-continued
P1-3
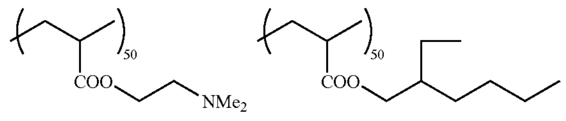
P1-4
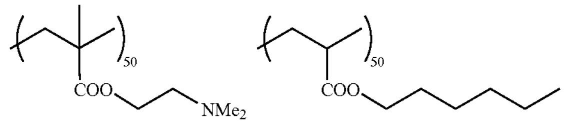
P1-5
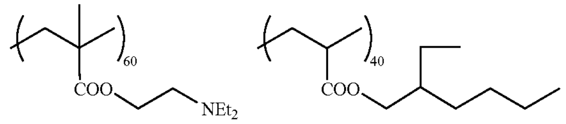
P1-6
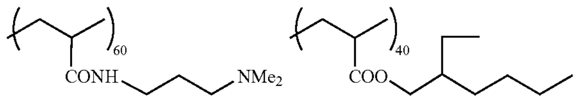
P1-7
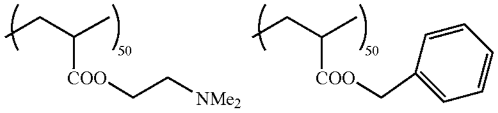
P1-8
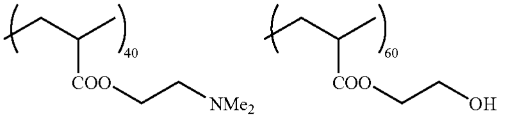
P1-9
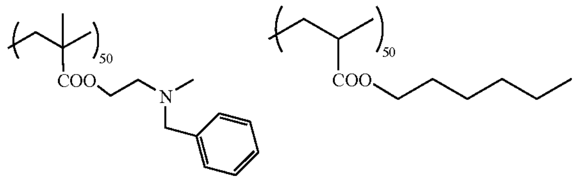
P1-10
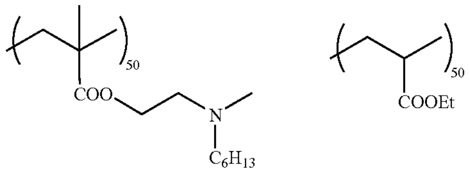
P-11
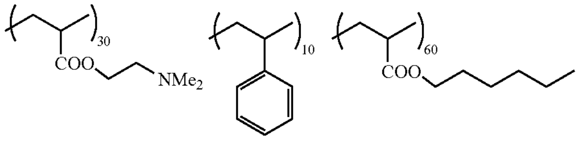
P1-12
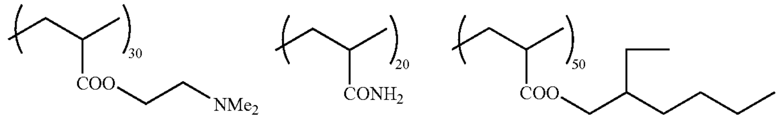

-continued

P1-13

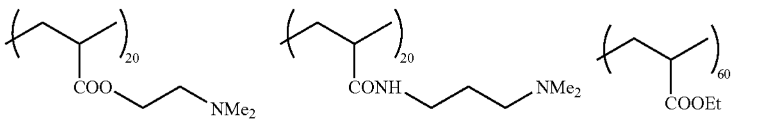

P1-14

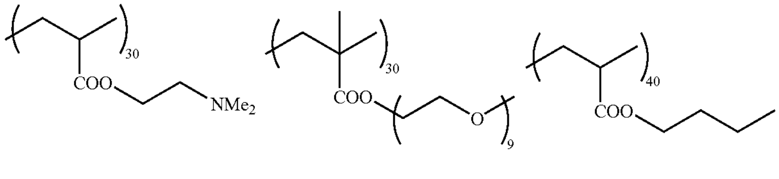

Preferable polymers having an amino group according to the present invention other than polymers having units represented by general formula (1) are as follows.

P1-15

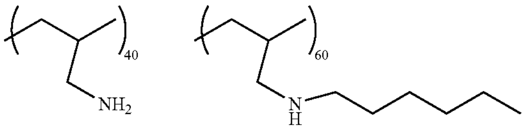

P1-16

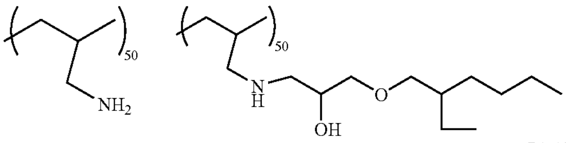

P1-17

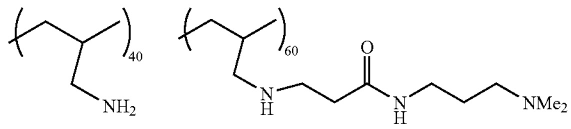

P1-18

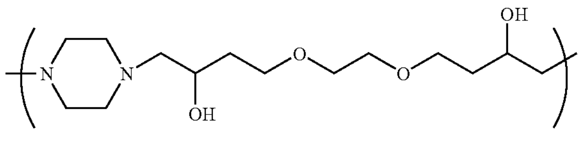

A polymer having therein a unit represented by general formula (1) can be synthesized using radical (co)polymerization. As the radical (co)polymerization, for example, a publicly known method such as bulk polymerization, solution polymerization, or emulsion polymerization can be used. However, there is no limitation to such a method, with it also being possible to use another publicly known method.

The weight average molecular weight of a polymer having an amino group used in the present invention is preferably in a range of 1000 to 50000, particularly preferably 2000 to 30000.

The amount used of the polymer having an amino group in the present invention is preferably in a range of 1 to 90% by mass, more preferably 10 to 75% by mass, particularly preferably 20 to 50% by mass, relative to all of each liquid. If the amount used is less than this, then it may not be possible to realize the effects of the present invention effectively, whereas if the amount used is greater than this, then the viscosity may become high, and hence problems with the ink ejectability may arise.

Polymers Having an Onium Group

A polymer having an onium group may be a homopolymer of only a monomer having an onium group, or a copolymer of a monomer having an onium group and another monomer. The "monomer having an onium group" content in the polymer having an onium group is preferably not less than 10 mol %, more preferably not less than 20 mol %.

Examples of the onium group are an ammonium group, a phosphonium group, and a sulfonium group, with an ammonium group being preferable. A polymer having an ammonium group can be obtained as a homopolymer of a monomer having a quaternary ammonium salt group, or a copolymer or a condensation polymer between a monomer having a quaternary ammonium salt group and another monomer.

In the present invention, as a polymer having an ammonium group, a polymer having therein at least a unit represented by the following general formula (2) or (3) is particularly preferable.

(General Formula 2) (General Formula 3)

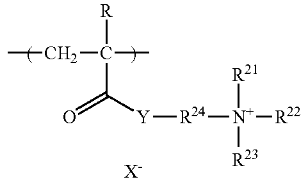

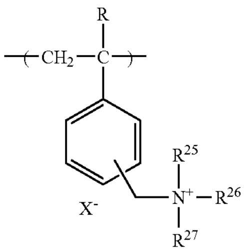

In the formulae, R represents a hydrogen atom or a methyl group, and $R^{21}$ to $R^{23}$ and $R^{25}$ to $R^{27}$ each independently represent an alkyl group, an aralkyl group, or an aryl group. $R^{24}$ represents an alkylene group, an aralkylene group, or an arylene group. Y represents O or NR', and R' represents a hydrogen atom or an alkyl group. $X^-$ represents a counter anion.

As an alkyl group represented by one of $R^{21}$ to $R^{23}$ and $R^{25}$ to $R^{27}$, an alkyl group having not more than 18 carbon atoms is preferable, with an alkyl group having not more than 16 carbon atoms being more preferable, and an alkyl group having not more than 12 carbon atoms being particularly preferable. The alkyl group may be straight chain, or cyclic, and may have substituents, examples of the substituents including alkoxy groups, aryloxy groups, halogen atoms, a hydroxyl group, carbamoyl groups, and amino groups.

As an aryl group represented by one of $R^{21}$ to $R^{23}$ and $R^{25}$ to $R^{27}$, an aryl group having not more than 18 carbon atoms is preferable, with an aryl group having not more than 16 carbon atoms being more preferable, and an aryl group having not more than 12 carbon atoms being particularly preferable. Moreover, the aryl group may have substituents, examples of the substituents including alkyl groups, alkoxy groups, aryloxy groups, halogen atoms, a hydroxyl group, carbamoyl groups, a cyano group, and amino groups.

As an aralkyl group represented by one of $R^{21}$ to $R^{23}$ and $R^{25}$ to $R^{27}$, an aralkyl group having not more than 18 carbon atoms is preferable, with an aralkyl group having not more than 16 carbon atoms being more preferable, and an aralkyl group having not more than 12 carbon atoms being particularly preferable. Examples of the alkyl part of the aralkyl group are alkyl groups as above, and examples of the aryl part of the aralkyl group are aryl groups as above. The alkyl part and/or the aryl part of the aralkyl group may have substituents.

It is particularly preferable for each of $R^{21}$ to $R^{23}$ and $R^{25}$ to $R^{27}$ to be independently an alkyl group or an aralkyl group. Of these, a methyl group, an ethyl group, a hexyl group, and a benzyl group are particularly preferable.

$R^{24}$ represents a bivalent connecting group, preferably an alkylene group, an aralkylene group, or an arylene group.

An alkylene group represented by $R^{24}$ preferably has not more than 8 carbon atoms, more preferably not more than 6 carbon atoms, particularly preferably not more than 4 carbon atoms. The alkylene group may be straight chain, or cyclic, and may have substituents, examples of the substituents including alkoxy groups, aryloxy groups, halogen atoms, a hydroxyl group, carbamoyl groups, and amino groups.

Specific examples of such (substituted) alkylene groups include a methylene group, an ethylene group, a propylene group, a trimethylene group, a tetramethylene group, a hexamethylene group, an octamethylene group, a 2-hydroxyethylene group, a 2-hydroxypropylene group, and a 2-methoxypropylene group.

An arylene group represented by $R^{24}$ preferably has not more than 12 carbon atoms, more preferably not more than 10 carbon atoms, particularly preferably not more than 8 carbon atoms. The arylene group may have substituents, examples of the substituents being as given above for the aryl group.

An aralkylene group represented by $R^{24}$ preferably has not more than 12 carbon atoms, more preferably not more than 10 carbon atoms, particularly preferably not more than 8 carbon atoms. Examples of the alkyl part of the aralkylene group are alkyl group as above, and examples of the aryl part of the aralkylene group are aryl groups as above. The aralkylene group may have substituents, examples of the substituents being as given above for the alkyl group and the aryl group.

As an alkyl group represented by R', those given above as alkyl groups for $R^{21}$ to $R^{23}$ and $R^{25}$ to $R^{27}$ are preferable.

"—Y—" is particularly preferably "—O—" or "—NH—".

$X^-$ is a counter anion, examples including a halide ion ($Cl^-$, $Br^-$, $I^-$), a sulfonate ion, alkylsulfonate ions, arylsulfonate ions, alkylcarboxylate ions, arylcarboxylate ions, $PF_6^-$, and $BF_4^-$. Of these, $Cl^-$, $Br^-$, a toluenesulfonate ion, a methanesulfonate ion, $PF_6$—, and $BF_4$— are particularly preferable.

In the case of a polymer having therein a unit represented by general formula (2) or (3), the content of the unit represented by general formula (2) or (3) in the polymer is preferably in a range of 10 to 100 mol %, more preferably 20 to 100 mol %.

Preferable specific examples of polymers having units represented by general formula (2) or (3) are as follows.

P2-1

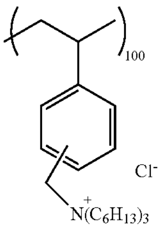

P2-2

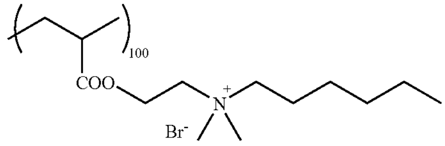

P2-3

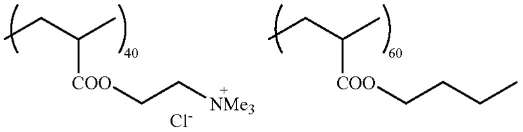

P2-4

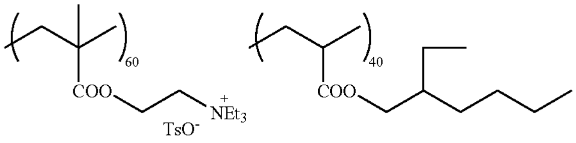

P2-5

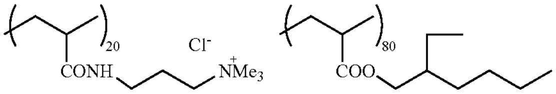

P2-6

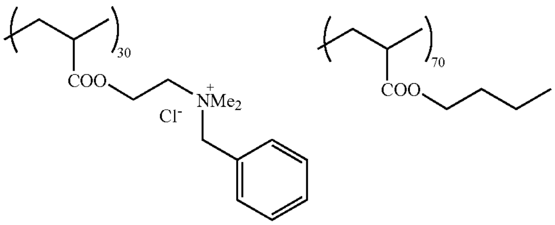

P2-7

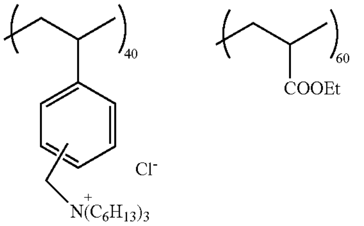

-continued

P2-8

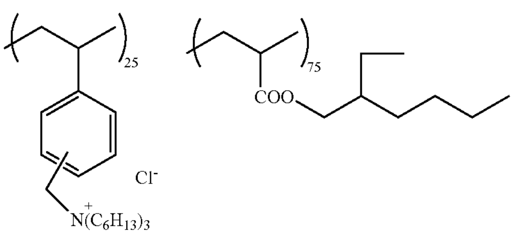

P2-9

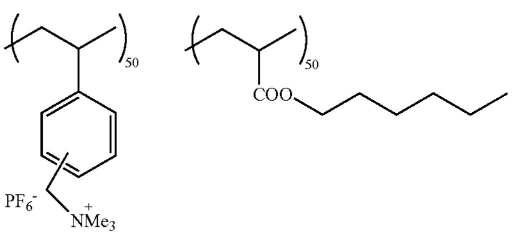

P2-10

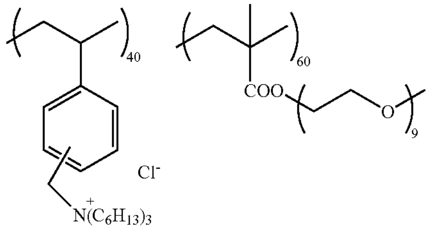

P2-11

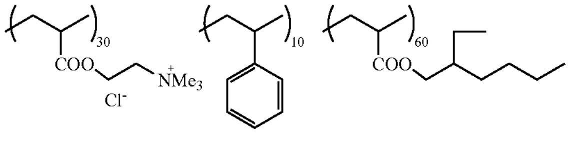

P2-12

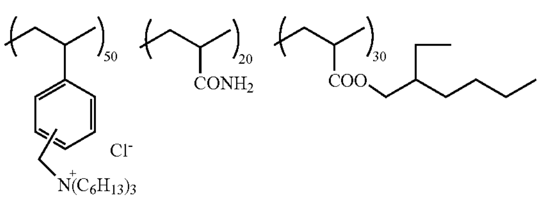

P2-13

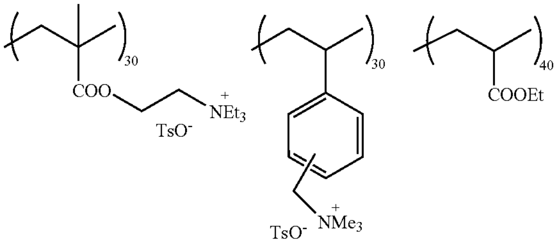

Examples of polymers having an onium group according to the present invention other than polymers having units represented by general formula (2) or (3) include epichlorohydrin-dimethylamine addition polymers, and addition polymers between a dihalide compound (e.g. xylylene dichloride, xylylene dibromide, 1,6-dibromohexane) and a diamine (N,N,N',N'-tetramethylethylenediamine, N,N,N',N'-tetramethylhexamethylenediamine, N,N'-dimethylpiperazine, diazobicyclooctane).

A polymer having an amino group (e.g. polyallylamine, polyvinylamine, polyethyleneimine, polydiallylamine, poly(N-methyldiallylamine), poly(N-ethyldiallylamine), a polyadduct between a diisocyanate (e.g. hexamethylene diisocyanate, isophorone diisocyanate, toluene diisocyanate, xylylene diisocyanate) and a diol having a tertiary amino group (e.g. N-methyldiethanolamine, N-ethyldiethanolamine, N,N'-3-hydroxypropylpiperazine), etc.) can also be obtained by adding methyl chloride, ethyl chloride, methyl bromide, ethyl bromide, methyl iodide, ethyl iodide, dimethyl sulfate, diethyl sulfate, methyl p-toluenesulfonate, or ethyl p-toluenesulfonate.

Of these, specific examples of preferable polymers are as follows.

P2-14

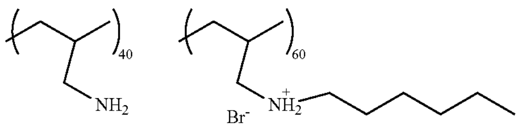

P2-15

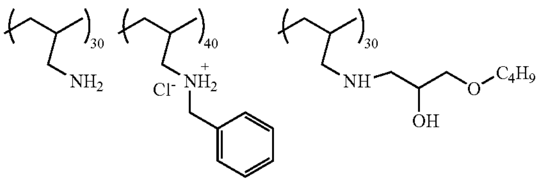

P2-16

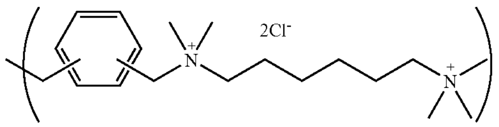

P2-17

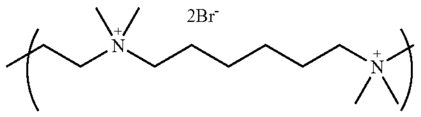

A polymer having a unit represented by general formula (2) or (3) can be obtained as a homopolymer of an undermentioned monomer having an ammonium group or a copolymer containing such a monomer.

Examples of the monomer having an ammonium group include trimethyl-p-vinylbenzyl ammonium chloride, trimethyl-m-vinylbenzyl ammonium chloride, triethyl-p-vinylbenzyl ammonium chloride, triethyl-m-vinylbenzyl ammonium chloride, N,N-dimethyl-N-ethyl-N-p-vinylbenzyl ammonium chloride, N,N-diethyl-N-methyl-N-p-vinylbenzyl ammonium chloride, N,N-dimethyl-N-n-propyl-N-p-vinylbenzyl ammonium chloride, N,N-dimethyl-N-n-octyl-N-p-vinylbenzyl ammonium chloride, N,N-dimethyl-N-benzyl-N-p-vinylbenzyl ammonium chloride, N,N-diethyl-N-benzyl-N-p-vinylbenzyl ammonium chloride, N,N-dimethyl-N-(4-methyl)benzyl-N-p-vinylbenzyl ammonium chloride, N,N-dimethyl-N-phenyl-N-p-vinylbenzyl ammonium chloride, trimethyl-p-vinylbenzyl ammonium bromide, trimethyl-m-vinylbenzyl ammonium bromide, trimethyl-p-vinylbenzyl ammonium sulfonate, trimethyl-m-vinylbenzyl ammonium sulfonate, trimethyl-p-vinylbenzyl ammonium acetate, trimethyl-m-vinylbenzyl ammonium acetate, N,N,N-triethyl-N-2-(4-vinylphenyl)ethyl ammonium chloride, N,N,N-triethyl-N-2-(3-vinylphenyl)ethyl ammonium chloride, N,N-diethyl-N-methyl-N-2-(4-vinylphenyl)ethyl ammonium chloride, N,N-diethyl-N-methyl-N-2-(4-vinylphenyl)ethyl ammonium acetate, trimethyl-2-(methacryloyloxy)ethyl ammonium chloride, triethyl-2-(methacryloyloxy)ethyl ammonium chloride, trimethyl-2-(acryloyloxy) ethyl ammonium chloride, triethyl-2-(acryloyloxy)ethyl ammonium chloride, trimethyl-3-(methacryloyloxy)propyl ammonium chloride, triethyl-3-(methacryloyloxy)propyl ammonium chloride, trimethyl-2-(methacryloylamino)ethyl ammonium chloride, triethyl-2-(methacryloylamino)ethyl ammonium chloride, trimethyl-2-(acryloylamino)ethyl ammonium chloride, triethyl-2-(acryloylamino)ethyl ammonium chloride, trimethyl-3-(methacryloylamino)propyl ammonium chloride, triethyl-3-(methacryloylamino)propyl ammonium chloride, trimethyl-3-(acryloylamino)propyl ammonium chloride, triethyl-3-(acryloylamino)propyl ammonium chloride, N,N-dimethyl-N-ethyl-2-(methacryloyloxy)ethyl ammonium chloride, N,N-diethyl-N-methyl-2-(methacryloyloxy)ethyl ammonium chloride, N,N-dimethyl-N-ethyl-3-(acryloylamino)propyl ammonium chloride, trimethyl-2-(methacryloyloxy)ethyl ammonium bromide, trimethyl-3-(acryloylamino)propyl ammonium bromide, trimethyl-2-(methacryloyloxy)ethyl ammonium sulfonate, trimethyl-3-(acryloylamino)propyl ammonium acetate, monomethyldiallyl ammonium chloride, dimethyldiallyl ammonium chloride, and allylamine hydrochloride.

Examples of monomers that can be copolymerized with these monomers include (meth)acrylic acid alkyl esters (e.g. C1-18 alkyl esters of (meth)acrylic acid such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, and stearyl (meth)acrylate), (meth)acrylic acid cycloalkyl esters (e.g. cyclohexyl (meth)acrylate, etc.), (meth)acrylic acid aryl esters (e.g. phenyl (meth)acrylate, etc.), aralkyl esters (e.g. benzyl (meth)acrylate, etc.), substituted (meth)acrylic acid alkyl esters (e.g. 2-hydroxyethyl (meth)acrylate, etc.), (meth)acrylamides (e.g. (meth)acrylamide, dimethyl (meth)acrylamide, etc.), aromatic vinyl compounds (e.g. styrene, vinyltoluene, α-methylstyrene, etc.), vinyl esters (e.g. vinyl acetate, vinyl propionate, vinyl versatate, etc.), allyl esters (e.g. allyl acetate, etc.), halogen-containing monomers (e.g. vinylidene chloride, vinyl chloride, etc.), vinyl cyanides (e.g. (meth)acrylonitrile, etc.), and olefins (e.g. ethylene, propylene, etc.).

Of these copolymerizable monomers, (meth)acrylic acid alkyl esters, (meth)acrylamides, and aromatic vinyl compounds are preferable, with methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, 2-hydroxyethyl (meth)acrylate, and styrene being particularly preferable.

A polymer as above can be synthesized through radical (co)polymerization of the monomer(s). As the radical polymerization, a publicly known method such as bulk polymerization, solution polymerization, or emulsion polymerization can be used. Moreover, a polymerization initiating catalyst well known to persons skilled in the art can be used as required.

The weight average molecular weight of a polymer having an onium group used in the present invention is preferably not less than 1000 but not more than 50000, particularly preferably not less than 2000 but not more than 30000.

The amount used of the polymer having an onium group in the present invention is preferably in a range of 1 to 90% by mass, more preferably 10 to 75% by mass, particularly preferably 20 to 50% by mass, relative to all of each liquid. If the amount used is less than this, then it may not be possible to achieve the effects of the present invention effectively, whereas if the amount used is greater than this, then the viscosity may become high, and hence problems with the ink ejectability may arise.

Polymers Having a Nitrogen-Containing Hetero Ring

A polymer having a nitrogen-containing hetero ring may be a homopolymer of only a monomer having a nitrogen-containing hetero ring, or a copolymer of a monomer having a nitrogen-containing hetero ring and another monomer. The "monomer having a nitrogen-containing hetero ring" content in the polymer having a nitrogen-containing hetero ring is preferably at least 10 mol %, more preferably at least 20 mol %.

Here, specific examples of the nitrogen-containing hetero ring include saturated hetero rings (e.g. aziridine, azetidine, pyrrolidone, piperidine, piperazine, morpholine, thiomorpholine, caprolactam, valerolactam), and unsaturated hetero rings (e.g. imidazole, pyridine, pyrrole, pyrazole, pyrazine, pyrimidine, indole, purine, quinoline, triazine, etc.).

These nitrogen-containing hetero rings may further have substituents, examples of the substituents including alkyl groups, aryl groups, alkoxy groups, aryloxy groups, halogen atoms, a hydroxyl group, carbamoyl groups, and amino groups.

A polymer used in the present invention is preferably a polymer obtained from a vinyl monomer having such a nitrogen-containing hetero ring. Specific examples include N-vinylpyrrolidone, N-vinylcaprolactam, acryloylmorpholine, acryloylthiomorpholine, N-vinylimidazole, 2-methyl-1-vinylimidazole, 2-vinylpyridine, 4-vinylpyridine, N-vinylcarbazole, N-methylmaleimide, N-ethylmaleimide, and 2-isopropenyl-2-oxazoline. Of these, N-vinylimidazole, 2-vinylpyridine, and 4-vinylpyridine are particularly preferable.

Furthermore, a polymer used in the present invention may be a copolymer between such a monomer and a monomer that can be copolymerized therewith. Examples of copolymerizable monomers include (meth)acrylic acid alkyl esters (e.g. C1-18 alkyl esters of (meth)acrylic acid such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, and stearyl (meth)acrylate, etc.), (meth) acrylic acid cycloalkyl esters (e.g. cyclohexyl (meth)acrylate, etc.), (meth)acrylic acid aryl esters (e.g. phenyl (meth)acrylate, etc.), aralkyl esters (e.g. benzyl (meth)acrylate, etc.), substituted (meth)acrylic acid alkyl esters (e.g. 2-hydroxyethyl (meth)acrylate, etc.), (meth)acrylamides (e.g. (meth) acrylamide, dimethyl (meth)acrylamide, etc.), aromatic vinyl compounds (e.g. styrene, vinyltoluene, α-methylstyrene, etc.), vinyl esters (e.g. vinyl acetate, vinyl propionate, vinyl versatate, etc.), allyl esters (e.g. allyl acetate, etc.), halogen-containing monomers (e.g. vinylidene chloride, vinyl chloride, etc.), vinyl cyanides (e.g. (meth)acrylonitrile, etc.), and olefins (e.g. ethylene, propylene, etc.).

Of these copolymerizable monomers, (meth)acrylic acid alkyl esters, (meth)acrylamides, and aromatic vinyl compounds are preferable, with methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, 2-hydroxyethyl (meth)acrylate, and styrene being particularly preferable.

The "monomer having a nitrogen-containing hetero ring" content in the polymer having a nitrogen-containing hetero ring is preferably not less than 10 but not more than 100 mol %, more preferably not less than 20 but not more than 100 mol %.

A polymer as above can be synthesized through radical (co)polymerization of the monomer(s). As the radical polymerization, a publicly known method such as bulk polymerization, solution polymerization, or emulsion polymerization can be used. Moreover, a polymerization initiating catalyst well known to persons skilled in the art can be used as required.

Furthermore, a polymer used in the present invention may be obtained by polycondensation. Examples include polymers obtained through polycondensation between a 2,4-dichlorotriazine (e.g. 2,4-dichloro-6-butylamino-1,3,5-triazine) and a diamine (e.g. N,N'-dimethylethylenediamine, N,N'-dimethylhexamethylenediamine, N,N'-dibutylhexamethylenediamine, N,N'-dioctylhexamethylenediamine, etc.), and polymers obtained through polycondensation between a piperazine and a dicarboxylic acid (e.g. adipic acid) ester.

Preferable specific examples of polymers having a nitrogen-containing hetero ring are as follows.

P3-1

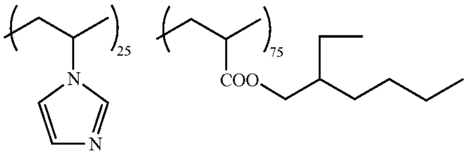

P3-2

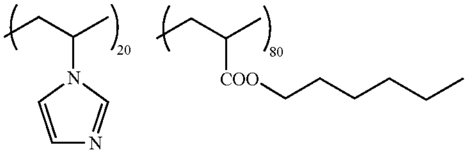

P3-3

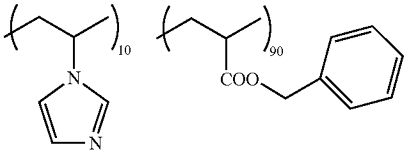

P3-4

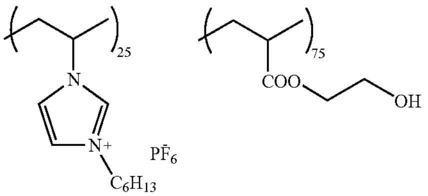

P3-5

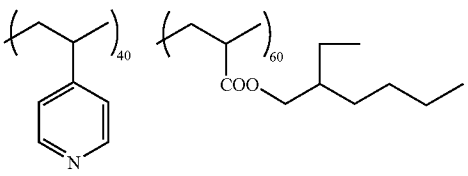

-continued

P3-6

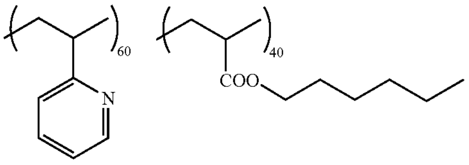

P3-7

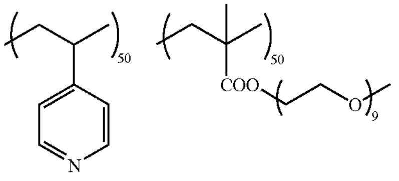

P3-8

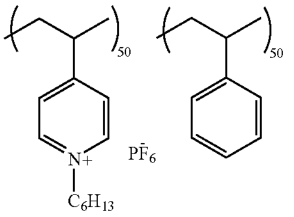

P3-9

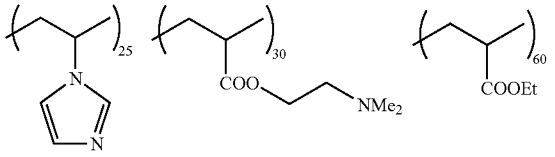

P3-10

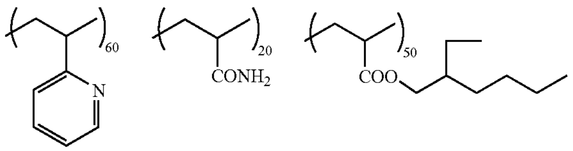

P3-11

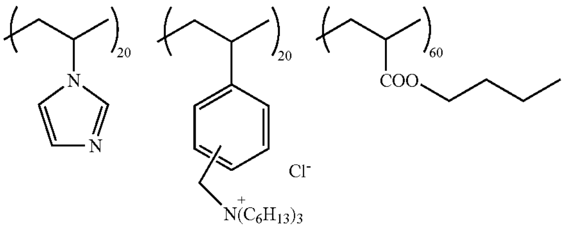

P3-12

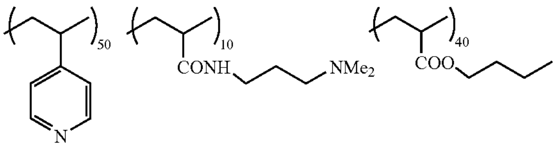

Furthermore, the following polymers are also preferable specific examples.

P3-13
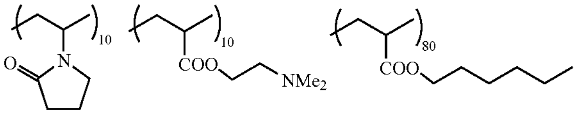
P3-14
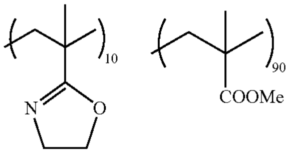
P3-15
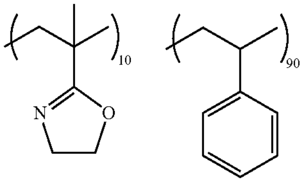
P3-16
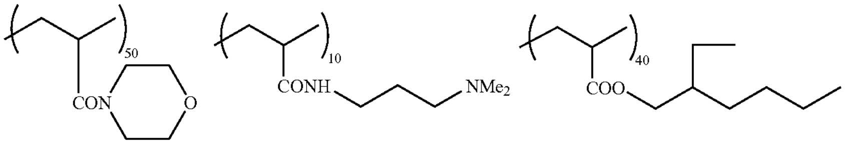
P3-17
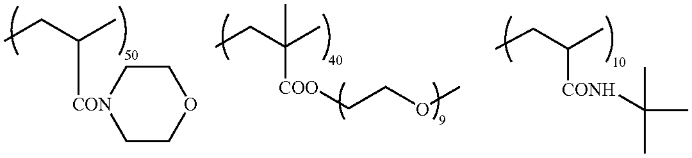
P3-18
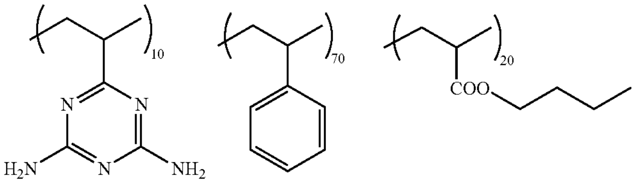
P3-19
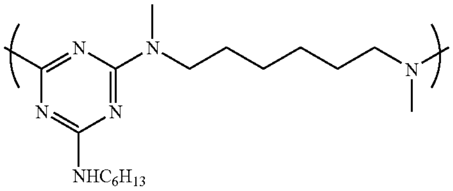
P3-20
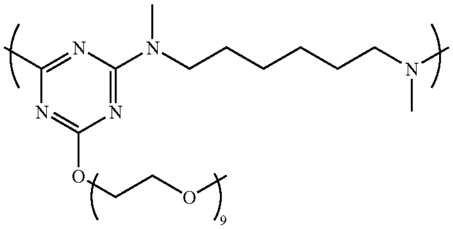
P3-21
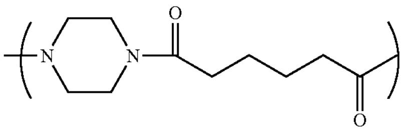

-continued

P3-22

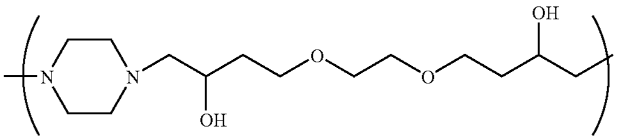

The weight average molecular weight of a polymer having a nitrogen-containing hetero ring used in the present invention is preferably not less than 1000 but not more than 50000, particularly preferably not less than 2000 but not more than 30000.

Such a polymer having a nitrogen-containing hetero ring is preferably contained in at least one liquid not containing a colorant, and furthermore may be contained in a liquid other than the first liquid and the second liquids, out of the plurality of liquids.

The amount used of the polymer having a nitrogen-containing hetero ring in the present invention is preferably in a range of 1 to 90% by mass, more preferably 10 to 75% by mass, particularly preferably 20 to 50% by mass, relative to all of each liquid. If the amount used is less than this, then it may not be possible to achieve the effects of the present invention effectively, whereas if the amount used is greater than this, then the viscosity may become high, and hence problems with the ink ejectability may arise.

Metal Compounds

Examples of metal compounds are metal salts of aliphatic carboxylic acids (e.g. acetic acid, propionic acid, butyric acid, valeric acid, isovaleric acid, pivalic acid, lauric acid, myristic acid, palmitic acid, stearic acid, 2-ethylhexanoic acid, lactic acid, pyruvic acid, etc.), metal salts of aromatic carboxylic acids (e.g. benzoic acid, salicylic acid, phthalic acid, cinnamic acid, etc.), metal salts of aliphatic sulfonic acids (e.g. methanesulfonic acid, ethanesulfonic acid, propanesulfonic acid, hexanesulfonic acid, 2-ethylhexanesulfonic acid, etc.), and metal salts of aromatic sulfonic acids (benzenesulfonic acid, naphthalenesulfonic acid, etc.), and also 1,3-diketone metal compounds. Of these, metal salts of aliphatic carboxylic acids, and 1,3-diketone metal compounds are preferable.

An aliphatic carboxylic acid as above may be straight chain, branched, or cyclic, and preferably has 2 to 40 carbon atoms, more preferably 6 to 25 carbon atoms. Moreover, the aliphatic carboxylic acid may have substituents, examples of the substituents including aryl groups, alkoxy groups, aryloxy groups, halogen atoms, a hydroxyl group, carbamoyl groups, amino groups, and a carboxy group.

Preferable examples of aryl groups as substituents include a phenyl group, alkylphenyl groups (e.g. a methylphenyl group, an ethylphenyl group, an n-propylphenyl group, an n-butylphenyl group, a cumenyl group, a mesityl group, a tolyl group, a xylyl group), a naphthyl group, a chlorophenyl group, a dichlorophenyl group, a trichlorophenyl group, a bromophenyl group, a hydroxyphenyl group, a methoxyphenyl group, an acetoxyphenyl group, and a cyanophenyl group, with a phenyl group and a naphthyl group being more preferable.

Preferable examples of alkoxy groups as substituents are a methoxy group, an ethoxy group, a propoxy group, an isopropoxy group, a butoxy group, a t-butoxy group, a hexyloxy group, a cyclohexyloxy group, a 2-ethylhexyloxy group, an octyloxy group, and a dodecyloxy group, with a methoxy group, an ethoxy group, a propoxy group, an isopropoxy group, a butoxy group, and a t-butoxy group being more preferable.

Preferable examples of aryloxy groups as substituents are a phenoxy group, a methylphenoxy group, an ethylphenoxy group, a cumenyloxy group, a tolyloxy group, a xylyloxy group, a naphthyloxy group, a chlorophenoxy group, a hydroxyphenoxy group, a methoxyphenoxy group, and an acetoxyphenoxy group, with a phenoxy group being more preferable.

Examples of halogen atoms as substituents are a fluorine atom, a chlorine atom, a bromine atom, and an iodine atom.

Preferable examples of carbamoyl groups as substituents are carbamoyl groups, alkylcarbamoyl groups (e.g. a methylcarbamoyl group, an ethylcarbamoyl group, a propylcarbamoyl group, a butylcarbamoyl group, etc.), and arylcarbamoyl groups (e.g. a phenylcarbamoyl group), with a carbamoyl group, a methylcarbamoyl group, and an ethylcarbamoyl group being more preferable.

Preferable examples of amino groups as substituents are a primary amino group, N-substituted amino groups (e.g. an N-methylamino group, an N-ethylamino group, an N-propylamino group, an N-butylamino group, an N-hexylamino group, an N-octylamino group, an N-benzylamino group), and N,N-disubstituted amino groups (e.g. an N,N-dimethylamino group, an N,N-diethylamino group, an N-methyl-N-ethylamino group, an N,N-dibutylamino group, an N-ethyl-N-octylamino group, an N-methyl-N-benzyl amino group), with an N-methylamino group, an N-ethylamino group, an N,N-dimethylamino group, an N,N-diethylamino group, and an N-methyl-N-ethylamino group being more preferable.

Particularly preferable aliphatic carboxylic acids are n-hexanoic acid, 2-ethylhexanoic acid, n-octanoic acid, lauric acid, myristic acid, palmitic acid, stearic acid, and 2-ethylhexanoic acid. Ethylenediaminetetraacetic acid is also a preferable example.

A 1,3-diketone as above may be may be straight chain, branched, or cyclic, and preferably has 5 to 40 carbon atoms, more preferably 5 to 25 carbon atoms. Examples include 2,4-pentadione, 3,5-heptadione, 2,2,6,6-tetramethylheptadione, 4,6-nonadione, 7,9-pentadecadione, 2,4-dimethyl-7,9-pentadecadione, 2-acetylcyclopentanone, 2-acetylcyclohexanone, 3-methyl-2,4-pentadione, 3-(2-ethylhexyl)2,4-pentadione, and 3-[4-(2-ethylhexyloxy)benzyl]-2,4-pentadione, with 2,4-pentadione, 7,9-pentadecadione, and 3-[4-(2-ethylhexyloxy)benzyl]-2,4-pentadione being preferable.

These groups may further have substituents, examples of the substituents including aryl groups, alkoxy groups, aryloxy groups, halogen atoms, a hydroxyl group, carbamoyl groups, amino groups, and a carboxy group. More preferable aryl groups, alkoxy groups, aryloxy groups, halogen atoms, hydroxyl groups, carbamoyl groups, and amino groups as substituents are as in the case of an aliphatic carboxylic acid described above.

An example of the metal in the metal compound is one selected from the group of zinc, aluminum, calcium, magnesium, iron, cobalt, nickel, and copper. Of these, zinc, aluminum, and nickel are preferable, with zinc being particularly preferable.

Preferable metal salts of aliphatic carboxylic acids in the present invention are as follows.

1-1

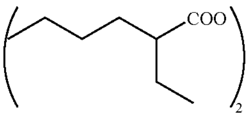

1-2

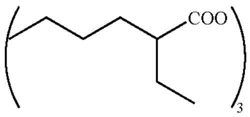

1-3

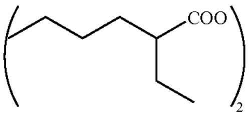

1-4

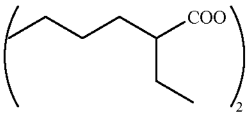

1-5

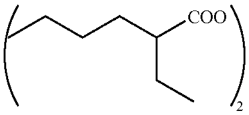

1-6

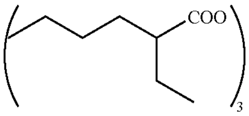

1-7

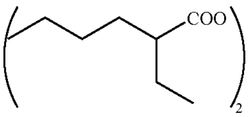

1-8

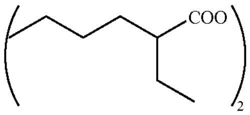

1-9

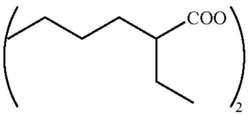

1-10

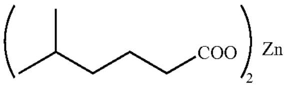

1-11

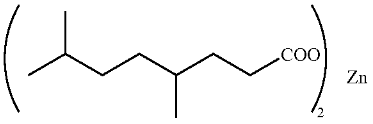

-continued 1-12

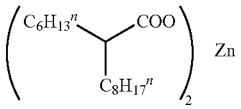

1-13

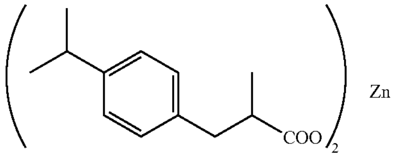

1-14

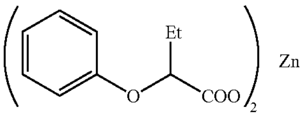

1-15

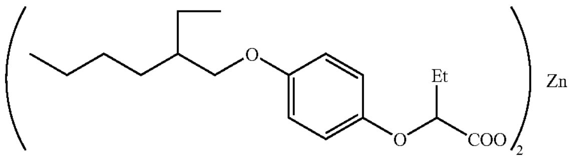

1-16

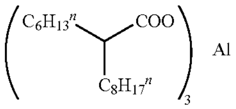

Furthermore, preferable specific examples of 1,3-diketone metal compounds in the present invention are as follows.

2-1

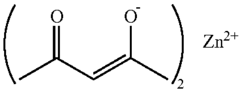

2-2

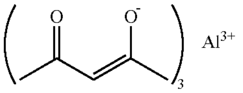

2-3

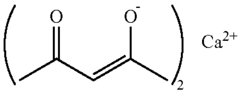

2-4

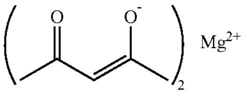

2-5

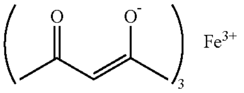

2-6

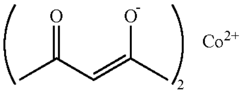

-continued 2-7

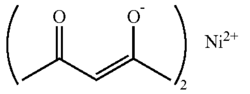

2-8

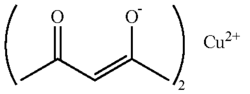

2-9

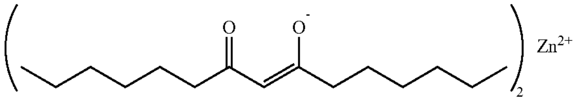

2-10

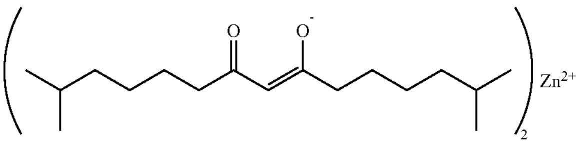

2-11

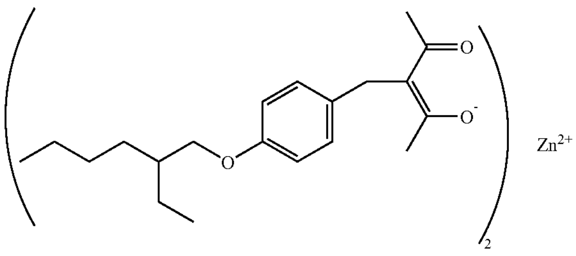

A metal salt of an aliphatic carboxylic acid or a 1,3-diketone metal compound as above can be synthesized through complexation in a solution. Alternatively, there is no limitation to this, but rather another publicly known method may be used.

The amount used of the metal compound in the present invention is preferably in a range of 1 to 90% by mass, more preferably 10 to 75% by mass, particularly preferably 20 to 50% by mass, relative to all of each liquid. If the amount used is less than this, then it may not be possible to achieve the effects of the present invention effectively, whereas if the amount used is greater than this, then the viscosity may become high, and hence problems with the ink ejectability may arise.

High-Boiling Organic Solvents (Oils)

In the present invention, the "high-boiling organic solvent" referred to here includes an organic solvent satisfying both the following Conditions (i) and (ii).

Condition (i)

The viscosity of organic solvent is 100 mPa·s or less at 25° C. (° centigrade), or 30 mPa·s or less at 60° C.

Condition (ii)

The boiling point of the organic solvent is 100° C. or more.

If an organic solvent that does not satisfy either condition of viscosity in the above Condition (i) is used, then the viscosity increases, and hence it can cause trouble with the application of the liquid onto the recording medium. On the other hand, if an organic solvent that does not satisfy the above Condition (ii) is used, then the organic solvent can evaporate during the image formation because the boiling point is too low, and hence it can reduce the effects of the prevention of liquid deposition interference (liquid landing interference), which can be brought about by the present invention. In addition, it is not environmentally desirable to emit the vaporized organic solvent to the atmosphere. Furthermore, desirably, the melting point of the high-boiling organic solvent is 80° C. or less, and the solubility of water in the high-boiling organic solvent (25° C.) is 4 gram (4 g) or less. The "solubility of water" in the present invention means the saturated concentration of water in the high-boiling organic solvent at 25° C., this being the mass (g) of water that can be dissolved in 100 g of the high-boiling organic solvent at 25° C.

Here, the "viscosity" in the present invention refers to the viscosity obtained using a RE80 viscometer made by Toki Sangyo Co., Ltd. The RE80 viscometer is a conical rotor/flat plate type viscometer corresponding to the E type, and the measurement is carried out using a rotor code No. 1 rotor at a rotational speed of 10 rpm. Note, however, that in the case of a viscosity higher than 60 mPa·s, the measurement is carried out with the rotational speed changed to 5 rpm, 2.5 rpm, 1 rpm, 0.5 rpm, or the like as required.

The amount used of the high-boiling organic solvent is preferably 5 to 2000% by mass, more preferably 10 to 1000% by mass, in terms of the consumed amount relative to the colorant used.

Description of Curing Energy

In the inkjet recording apparatus 10 shown in the present example, from the viewpoint of obtaining excellent fixation, there is a process of fixing the image on the recording paper 16 by applying energy after the image has been formed.

That is, by applying energy to the treatment liquid (SA) and the colored inks that have been deposited onto the recording paper 16, polymerization and curing of these liquids is promoted, whereby a firmer image can be formed more efficiently. In the present example, the application of energy is carried out by performing irradiation of a radiation such as UV.

That is, by applying energy (UV) using the preliminary curing light sources 27A and the main curing light source 27B, generation of active species by decomposition of the polymerization initiator in the liquids that have been deposited on the recording paper 16 is promoted; and moreover by increasing the amount of the active species or increasing the temperature, polymerization and curing of the polymerizable compound(s) by the active species is promoted.

In the present example, one example of an exposing light source for promoting the polymerization of the polymerizable compound(s) has been given as being an ultraviolet radiation light source, but other than this, the application of energy may be carried out by performing irradiation of visible light, α-rays, γ-rays, X-rays, an electron beam, or the like. Of these, from the viewpoints of cost and safety, it is preferable to use ultraviolet radiation or visible light, with it being more preferable to use ultraviolet radiation. The amount of energy required for the curing reaction varies depending on the type and content of the polymerization initiator, and is generally approximately 1 to 500 mJ/cm$^2$.

Examples of the preliminary curing light sources 27A and the main curing light source 27B used in the inkjet recording apparatus 10 in the present example include metal halide lamps, xenon lamps, high-pressure mercury lamps, low-pressure mercury lamps, carbon arc lamps, sterilizing lamps, UV fluorescent lamps, and UV LEDs. The preliminary curing light sources 27A need merely be such as to be able to carry out the preliminary curing of the colored inks. Hence the preliminary curing light sources 27A may perform the irradiation with a lower amount of energy per unit time (per unit area) than that of the irradiation by the main curing light source 27B. Smaller light sources (in terms of both irradiation energy and size) may thus be used for the preliminary curing light sources 27A than for the main curing light source 27B. An example is a mode in which UV fluorescent lamps or UV LEDs are used as the preliminary curing light sources 27A.

An example is a mode in which UV fluorescent lamps or UV LEDs are used as the preliminary curing light sources 27A, and a metal halide lamp is used as the main curing light source 27B.

Description of Recording Medium

In the present invention, either an ink-permeable recording medium, or a non-ink-permeable recording medium may be used. Examples of ink-permeable recording media include plain paper, inkjet-specific paper, coated paper, multi-use paper compatible with inkjet and electrophotography, a cloth, a nonwoven cloth, a porous film, and a polymeric absorbent. These are described as "member on which recording is carried out" in Japanese Patent Application Publication No. 2001-181549 etc.

The excellent effects of the present invention are remarkable with a non-ink-permeable recording medium. Examples of non-ink-permeable recording media include art paper, synthetic resins, rubber, resin-coated paper, glass, metal, ceramics, and wood. In addition, to add functionality, a composite substrate in which a plurality of these materials are combined may be used.

As a synthetic resin, any synthetic resin may be used. Examples include polyesters such as polyethylene terephthalate and polybutadiene terephthalate, polyvinyl chloride, polystyrene, polyethylene, polyurethanes, polyolefins such as polypropylene, acrylic resins, polycarbonates, acrylonitrile-butadiene-styrene copolymers and so on, diacetates, triacetates, polyimides, cellophane, and celluloid. There are no limitations on the thickness or shape of the synthetic resin substrate, which may be a film, a card, or a block. Moreover, the synthetic resin may be transparent or opaque.

As the mode of use of the synthetic resin, use in the form of a film used in so-called flexible packaging is also preferable, it being possible to use a film of any of various non-absorbent plastics, examples of the various plastic films including a PET film, an OPS film, an OPP film, a PNy film, a PVC film, a PE film, and a TAC film. As other plastics, a polycarbonate, an acrylic resin, ABS, polyacetal, PVA, rubber, or the like can be used.

Examples of resin-coated paper include a paper support laminated with a polyolefin resin on both surfaces of the paper, or a transparent polyester film, an opaque polyester film, or an opaque polyolefin resin film. Particularly preferable is a paper support laminated with a polyolefin resin on both surfaces of the paper.

As a metal, any metal can be used, it being preferable to use aluminum, iron, gold, silver, copper, nickel, titanium, chromium, molybdenum, silicon, lead, zinc, or the like, or a composite material thereof such as stainless steel.

Moreover, as the recording medium used in the present invention, it is also possible to use a read only optical disk such as a CD-ROM or a DVD-ROM, a write once type optical disk such as a CD-R or a DVD-R, or a rewritable optical disk, an ink-receiving layer and a luster-conferring layer being applied onto the label surface side thereof.

Other Embodiment

In the mode of applying the post-treatment liquid (SB) onto the recording medium 16, a simple coating member configured such that the flexible coating roller 12SB can be made to contact with the recording medium 16 so as to apply the post-treatment liquid (SB) may be used, or a coating device as follows may be used. There are no particular limitations on the coating device, it being possible to select a publicly known coating device as appropriate in accordance with the object. Examples include an air doctor coater, a blade coater, a rod coater, a knife coater, a squeeze coater, a dip coater, a reverse roll coater, a transfer roll coater, a gravure coater, a kiss roll coater, a cast coater, a spray coater, a curtain coater, and an extrusion coater. For details, see "Kotingu Kogaku" ("Coating Engineering") by Yuji HARASAKI.

The treatment liquid (SA) may be attached onto certain predetermined areas of the recording medium 16 substantially uniformly, and hence the dot formation is not required to be at such a high density as for the colored inks. The treatment liquid head 12SA may thus be configured such that the treatment liquid head 12SA has fewer nozzles (a lower nozzle density) than the heads 12C, 12M, 12Y, and 12K.

The treatment liquid head 12SA may also be configured to have a larger nozzle size than that of the heads 12C, 12M, 12Y, and 12K. By increasing the nozzle size for the treatment liquid head 12SA, it becomes possible to eject a treatment liquid (SA) having a high viscosity.

According to the inkjet recording apparatus 10 having the configuration described above, in the case of a two liquid type inkjet recording apparatus that forms an image on a recording medium 16 using a treatment liquid (SA) containing a polymerization initiator, a diffusion preventing agent, and an oil, and colored inks each containing a polymerizable compound and a coloring material, the treatment liquid (SA) and the colored inks that have been deposited on the recording medium 16 are subjected to preliminary curing by being irradiated with UV from the preliminary curing light source 27A. Then, a post-treatment liquid (SB) containing a polymerization initiator and a UV monomer is applied over the whole surface of the recording medium 16, and main curing is carried out by performing irradiation of UV by means of the main curing light source 27B. Thereby, remaining monomer and remaining oil is confined in the cured matrix, and hence uncured treatment liquid (SA) and uncured colored ink can be prevented from remaining on the recording medium 16.

Moreover, the configuration is such that the post-treatment liquid (SB) is applied using the coating roller 12SB. As a result, the recorded surface (image-formed surface) of the recording medium 16 is leveled. Moreover, because the coating roller 12SB is used as the device that attaches the post-treatment liquid (SB) onto the recording medium 16, the post-treatment liquid (SB) can be made to have a high viscosity that would not be suitable in the case of ejection using an ejection head, and hence the curing ability of the post-treatment liquid (SB) can be improved.

In the present example, an inkjet recording apparatus 10 in which page-wide full line type heads 50 (12C, 12M, 12Y, 12K) each having a nozzle row of a length corresponding to the whole width of the recording medium 16 are used, has been described. However, the scope of application of the present invention is not limited to this, but rather the present invention can also be applied to an inkjet recording apparatus in which serial heads according to which image recording is carried out while moving short recording heads to and fro are used.

Moreover, in the present example, an inkjet recording apparatus 10 according to which an image is formed on the recording medium 16 by ejecting ink from nozzles 51 in heads (inkjet heads) 50 has been described. However, the scope of application of the present invention is not limited to this, but rather the present invention can be widely applied also to an image forming apparatus that forms an image (having a three-dimensional shape) with a liquid other than ink, such as a resist, a liquid ejecting apparatus such as a dispenser in which a chemical, water or the like is ejected from nozzles (ejection holes), and so on.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus that attaches a plurality of liquids onto a recording medium so as to form a desired image, the image forming apparatus comprising:

a first liquid attaching device that attaches onto the recording medium a first liquid which contains a high-boiling organic solvent, a polymerization initiator, and a diffusion preventing agent for preventing diffusion and smearing of a second liquid to be attached onto the recording medium after the first liquid is attached onto the recording medium;

a second liquid attaching device that attaches the second liquid which contains a radiation-curable polymerizable compound, onto at least an area of the recording medium onto which the first liquid has been attached;

a third liquid attaching device that attaches a third liquid which contains a polymerization initiator and a radiation-curable polymerizable compound, onto at least an area of the recording medium onto which the first liquid and the second liquid have been attached; and a first radiation irradiating device that irradiates at least an area of the recording medium onto which the third liquid has been attached, with a radiation.

2. The image forming apparatus as defined in claim 1, wherein the second liquid contains a coloring material.

3. The image forming apparatus as defined in claim 1, further comprising a second radiation irradiating device that irradiates at least an area of the recording medium onto which the first liquid and the second liquid have been attached, with a radiation.

4. The image forming apparatus as defined in claim 1, wherein the first liquid attaching device includes a droplet depositing device that deposits a droplet onto the recording medium.

5. The image forming apparatus as defined in claim 1, wherein the second liquid attaching device includes a droplet depositing device that deposits a droplet onto the recording medium.

6. The image forming apparatus as defined in claim 1, wherein the third liquid attaching device includes a coating device that applies the third liquid onto the recording medium.

7. The image forming apparatus as defined in claim 1, wherein each of the first liquid and the second liquid has a viscosity of not less than 10 mPa·s and not more than 50 mPa·s.

8. The image forming apparatus as defined in claim 1, wherein the first liquid has a lower viscosity than the third liquid.

9. An image forming method for attaching a plurality of liquids onto a recording medium so as to form a desired image, the image forming method comprising the steps of:

attaching onto the recording medium a first liquid which contains a high-boiling organic solvent, a polymerization initiator, and a diffusion preventing agent for preventing diffusion and smearing of a second liquid to be attached onto the recording medium after the first liquid is attached onto the recording medium;

attaching the second liquid which contains a radiation-curable polymerizable compound, onto at least an area of the recording medium onto which the first liquid has been attached;

attaching a third liquid which contains a polymerization initiator and a radiation-curable polymerizable compound, onto at least an area of the recording medium onto which the first liquid and the second liquid have been attached; and irradiating at least an area of the recording medium onto which the third liquid has been attached, with a radiation.

10. The image forming method as defined in claim 9, wherein the second liquid contains a coloring material.

11. The image forming method as defined in claim 9, further comprising the step of, after the second liquid is attached onto at least the area of the recording medium onto which the first liquid has been attached, irradiating at least an area of the recording medium onto which the first liquid and the second liquid have been attached with a radiation, so as to cure or semi-cure the first liquid and the second liquid, wherein the third liquid is attached onto at least the area of the recording medium onto which the first liquid and the second liquid have been attached after at least the area of the recording medium onto which the first liquid and the second liquid have been attached is irradiated with the radiation.

* * * * *